United States Patent
Mercado

(10) Patent No.: US 10,338,344 B2
(45) Date of Patent: *Jul. 2, 2019

(54) SMALL FORM FACTOR TELEPHOTO CAMERA

(71) Applicant: Apple Inc., Cupertino, CA (US)

(72) Inventor: Romeo I. Mercado, Freemont, CA (US)

(73) Assignee: Apple Inc., Cupertino, CA (US)

( * ) Notice: Subject to any disclaimer, the term of this patent is extended or adjusted under 35 U.S.C. 154(b) by 701 days.

This patent is subject to a terminal disclaimer.

(21) Appl. No.: 14/961,790

(22) Filed: Dec. 7, 2015

(65) Prior Publication Data

US 2016/0085059 A1     Mar. 24, 2016

Related U.S. Application Data

(63) Continuation of application No. 14/069,027, filed on Oct. 31, 2013, now Pat. No. 9,223,118.

(51) Int. Cl.
    *H04N 5/225*     (2006.01)
    *H04N 5/232*     (2006.01)
    (Continued)

(52) U.S. Cl.
    CPC ........... *G02B 13/0045* (2013.01); *G02B 9/34* (2013.01); *G02B 9/60* (2013.01); *G02B 13/004* (2013.01);
(Continued)

(58) Field of Classification Search
CPC ...... H04N 5/225; H04N 5/2254; H04N 5/232; H04N 5/23212; H04N 5/2253; G02B 13/0045

See application file for complete search history.

(56) References Cited

U.S. PATENT DOCUMENTS

| | | | |
|---|---|---|---|
| 4,359,271 A | 11/1982 | Mihara | |
| 5,445,513 A | 8/1995 | Siggers | |

(Continued)

FOREIGN PATENT DOCUMENTS

| | | |
|---|---|---|
| CN | 101071196 | 11/2007 |
| CN | 105359006 | 2/2016 |

(Continued)

OTHER PUBLICATIONS

Japanese Office Action from Application No. 2016-552423, dated Jun. 19, 2017, Apple Inc., pp. 1-30. Japanese and English translation.

(Continued)

*Primary Examiner* — Abdelaaziz Tissire
(74) *Attorney, Agent, or Firm* — Robert C. Kowert; Meyertons, Hood, Kilvin, Kowert & Goetzel, P.C.

(57) ABSTRACT

A compact telephoto lens system that may be used in a small form factor cameras. The lens system may include five lens elements with refractive power. Alternatively, the lens system may include four lens elements with refractive power. At least one of the object side and image side surfaces of at least one of the lens elements is aspheric. Total track length (TTL) of the lens system may be 6.0 mm or less. Focal length f of the lens system may be at or about 7.0 mm (for example, within a range of 6.5-7.5 mm). Lens elements are selected and configured so that the telephoto ratio (TTL/f) satisfies the relation 0.74<TTL/f<1.0. Materials, radii of curvature, shapes, sizes, spacing, and aspheric coefficients of the lens elements may be selected to achieve quality optical performance and high image resolution in a small form factor telephoto camera.

20 Claims, 17 Drawing Sheets

(51) Int. Cl.
*G02B 13/00* (2006.01)
*G02B 13/02* (2006.01)
*G02B 9/34* (2006.01)
*G02B 9/60* (2006.01)

(52) U.S. Cl.
CPC ............ *G02B 13/02* (2013.01); *H04N 5/225* (2013.01); *H04N 5/2253* (2013.01); *H04N 5/2254* (2013.01); *H04N 5/232* (2013.01); *H04N 5/23212* (2013.01)

(56) References Cited

U.S. PATENT DOCUMENTS

| | | | |
|---|---|---|---|
| 5,646,788 A * | 7/1997 | Bietry | .............. G02B 5/005 359/740 |
| 7,042,656 B2 | 5/2006 | Chen et al. | |
| 7,295,386 B2 | 11/2007 | Taniyama | |
| 7,345,830 B2 | 3/2008 | Shinohara | |
| 7,453,654 B2 | 11/2008 | Shinohara | |
| 7,502,181 B2 | 3/2009 | Shinohara | |
| 7,554,597 B2 | 6/2009 | Scherling | |
| 7,626,767 B2 | 12/2009 | Kudo | |
| 7,663,814 B2 | 2/2010 | Kitahara | |
| 8,000,031 B1 * | 8/2011 | Tsai | .............. G02B 13/0045 359/714 |
| 8,184,378 B2 | 5/2012 | Chia | |
| 9,223,118 B2 * | 12/2015 | Mercado | ........... H04N 5/23212 |
| 2003/0193605 A1 | 10/2003 | Yamaguchi | |
| 2006/0193063 A1 | 8/2006 | Ku et al. | |
| 2008/0186594 A1 | 8/2008 | Jeong et al. | |
| 2008/0225408 A1 | 9/2008 | Park et al. | |
| 2009/0015681 A1 * | 1/2009 | Pipkorn | ............. H04N 5/23212 348/208.12 |
| 2009/0128927 A1 * | 5/2009 | Chen | ................... G02B 13/004 359/715 |
| 2010/0309367 A1 * | 12/2010 | Iba | ........................... G02B 9/34 348/345 |
| 2010/0315724 A1 | 12/2010 | Fukuta et al. | |
| 2011/0115965 A1 | 5/2011 | Engelhardt et al. | |
| 2011/0249347 A1 | 10/2011 | Kubota | |
| 2012/0013998 A1 * | 1/2012 | Tang | ........................ G02B 9/34 359/715 |
| 2012/0081798 A1 | 4/2012 | Ryu | |
| 2012/0087020 A1 * | 4/2012 | Tang | .................. G02B 13/0045 359/714 |
| 2012/0249815 A1 * | 10/2012 | Bohn | ................... H04N 5/2254 348/208.99 |
| 2013/0003195 A1 | 1/2013 | Kubota et al. | |
| 2013/0021677 A1 | 1/2013 | Kubota | |
| 2013/0021678 A1 | 1/2013 | Tsai et al. | |
| 2013/0114151 A1 | 5/2013 | Chen et al. | |
| 2013/0176631 A1 * | 7/2013 | Tsai | ................... G02B 13/0045 359/714 |
| 2013/0182336 A1 | 7/2013 | Hsu et al. | |
| 2013/0279021 A1 | 10/2013 | Chen et al. | |
| 2014/0300975 A1 * | 10/2014 | Tsai | ................... G02B 13/0045 359/714 |
| 2015/0029601 A1 * | 1/2015 | Dror | ....................... G02B 9/60 359/764 |

FOREIGN PATENT DOCUMENTS

| | | | | |
|---|---|---|---|---|
| JP | 2008-176185 A | | 7/2008 | |
| JP | 2008176185 | | 7/2008 | |
| JP | 2008176185 A | * | 7/2008 | .............. G02B 9/34 |
| JP | 2010-152042 | | 7/2010 | |
| JP | 2016523389 | | 8/2016 | |
| KR | 10-2012-0034413 | | 4/2012 | |
| TW | 201331619 | | 8/2013 | |
| TW | 201339632 | | 10/2013 | |
| WO | 2007145194 | | 12/2007 | |
| WO | 2015/001440 | | 1/2015 | |

OTHER PUBLICATIONS

European Search Report from Application No. 14857387.6-1562 / 3063580; PCT/US2014061037, dated Jun. 7, 2017, Apple, Inc., pp. 1-9.
Search Report from the Intellectual Property Office for ROC (Taiwan) Patent Application No. 103137485F, dated Jun. 25, 2015, Apple Inc., pp. 1-5.
Abstract for TW 200632367, Published Sep. 16, 2006, Fujinon Corporation JP, pp. 1-2.
International Search Report and Written Opinion from PCT/US2014/061037, dated Jan. 14, 2015, Apple Inc., pp. 1-10.
U.S. Appl. No. 14/291,544, filed May 30, 2014, Romeo I. Mercado.
U.S. Appl. No. 14/291,571, filed May 30, 2014, Romeo I. Mercado.
U.S. Appl. No. 14/069,027, filed Oct. 31, 2015, Romeo I. Mercado.
First Office Action from Chinese Application No. 201410601410.1, dated Jul. 11, 2016, Apple Inc., pp. 1-17.
NOA and Search Report from Taiwan Patent Application No. 104143616 (no English translation), dated Sep. 29, 2016, pp. 1-3.
International Preliminary Report on Patentability from PCT/US2014/061037, dated May 12, 2016, Apple Inc., pp. 1-7.
Korean Intellectual Property Office Notice of Preliminary Rejection from Application No. 10-2016-7013520, (Korean version and English translation), dated Aug. 29, 2018, (Apple Inc), pp. 1-10.
Decision to Grant from Japanese Application No. 2016-552423, dated Jan. 24, 2018 (English translation & Japanese version), Apple, Inc., pp. 1-4.

* cited by examiner

SMALL FORM FACTOR TELEPHOTO CAMERA

This application is a continuation of U.S. patent application Ser. No. 14/069,027, filed Oct. 31, 2013, which is hereby incorporated by reference herein in its entirety.

BACKGROUND

Technical Field

This disclosure relates generally to camera systems, and more specifically to high-resolution, small form factor telephoto camera systems.

Description of the Related Art

The advent of small, mobile multipurpose devices such as smartphones and tablet or pad devices has resulted in a need for high-resolution, small form factor cameras for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens system with improved imaging quality performance has increased.

SUMMARY OF EMBODIMENTS

Embodiments of the present disclosure may provide a high-resolution telephoto camera in a small package size. A camera is described that includes a photosensor and a compact telephoto lens system. Embodiments of a compact telephoto lens system are described that may provide a larger image and with longer effective focal length than has been realized in conventional small form factor cameras. Embodiments of the telephoto camera may be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers. In some embodiments, a telephoto camera as described herein may be included in a device along with a conventional, wider-field small format camera, which would for example allow the user to select between the different camera formats (telephoto or wide-field) when capturing images with the device.

Embodiments of a compact telephoto lens system are described that include five lens elements with refractive power. In addition, embodiments of a compact telephoto lens system are described that include four lens elements with refractive power. In embodiments, at least one of the object side and image side surfaces of at least one of the lens elements is aspheric.

In at least some embodiments, the telephoto lens system may be a fixed telephoto lens system configured such that the effective focal length f of the lens system is at or about 7.0 millimeters (mm) (e.g., within a range of 6.0-8.0 mm), the F-number (focal ratio) is within a range from about 2.4 to about 10.0, the field of view (FOV) is at or about 36 degrees, and the total track length (TTL) of the lens system is within a range of about 5.2 to about 7.0 mm. More generally, the lens system may be configured such that that the telephoto ratio (TTL/f) satisfies the relation:

$$0.74 < TTL/f < 1.0.$$

In the example embodiments described herein, the telephoto lens system may be configured such that the effective focal length f of the lens system is 7.0 mm, and the F-number is 2.8. However, note that the focal length (and/or other parameters) may be scaled or adjusted to meet specifications of optical, imaging, and/or packaging constraints for other camera system applications. In addition, in some embodiments, the telephoto lens system may be adjustable. For example, the telephoto lens system may be equipped with an adjustable iris or aperture stop. Using an adjustable aperture stop, the F-number (focal ratio, or f/#) may be dynamically varied within some range, for example within the range of 2.8 to 10. In some embodiments, the lens system may be used at faster focal ratios (f/#<2.8) with degraded image quality performance at the same FOV (e.g. 36 degrees), or with reasonably good performance at a smaller FOV.

The refractive lens elements in the various embodiments may be composed of plastic materials. In at least some embodiments, the refractive lens elements may be composed of injection molded optical plastic materials. However, other suitable transparent materials may be used. Also note that, in a given embodiment, different ones of the lens elements may be composed of materials with different optical characteristics, for example different Abbe numbers and/or different refractive indices.

In embodiments of the compact telephoto lens system, the lens element materials may be selected and the refractive power distribution of the lens elements may be calculated to satisfy a lens system effective focal length requirement and to correct chromatic aberrations and the field curvature or Petzval sum. The monochromatic and chromatic variations of optical aberrations may be reduced by adjusting the radii of curvature and aspheric coefficients or geometrical shapes of the lens elements and axial separations to produce well-corrected and balanced minimal residual aberrations, as well as to reduce the total track length (TTL) and to achieve quality optical performance and high image resolution in a small form factor telephoto camera.

Figure 1:
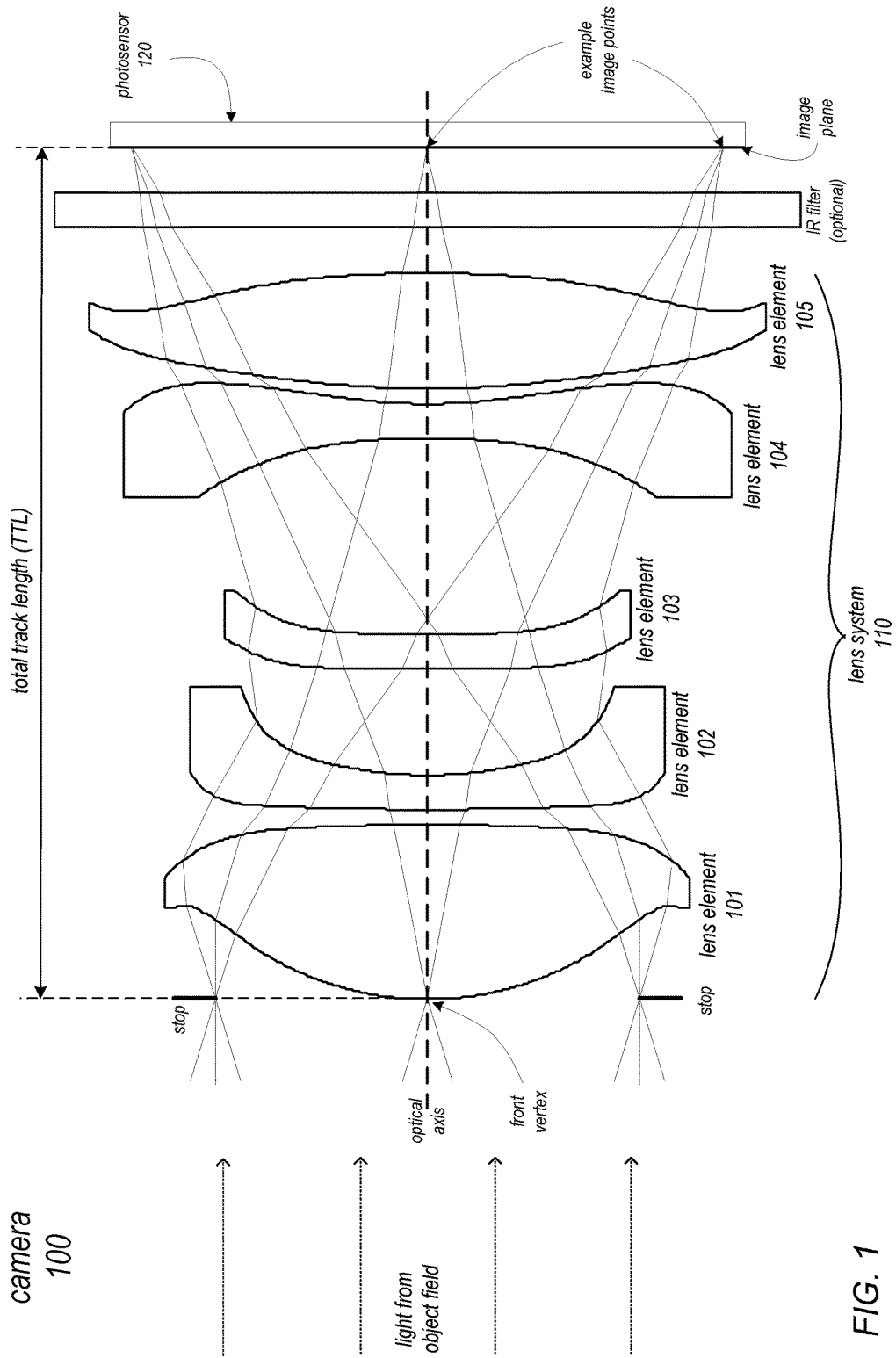
FIG. 1 is a cross-sectional illustration of an example embodiment of a compact telephoto camera including a compact telephoto lens system that includes five refractive lens elements.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of a small form factor camera including a photosensor and a compact telephoto lens system are described. Various embodiments of a compact telephoto lens system including four or five lens elements are described that may be used in the camera and that provide a larger image and with longer effective focal length than has been realized in conventional compact cameras. The camera may be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers, and so on. However, note that aspects of the camera (e.g., the lens system and photosensor) may be scaled up or down to provide cameras with larger or smaller package sizes. In addition, embodiments of the camera system may be implemented as stand-alone digital cameras. In addition to still (single frame capture) camera applications, embodiments of the camera system may be adapted for use in video camera applications.

Figure 3:
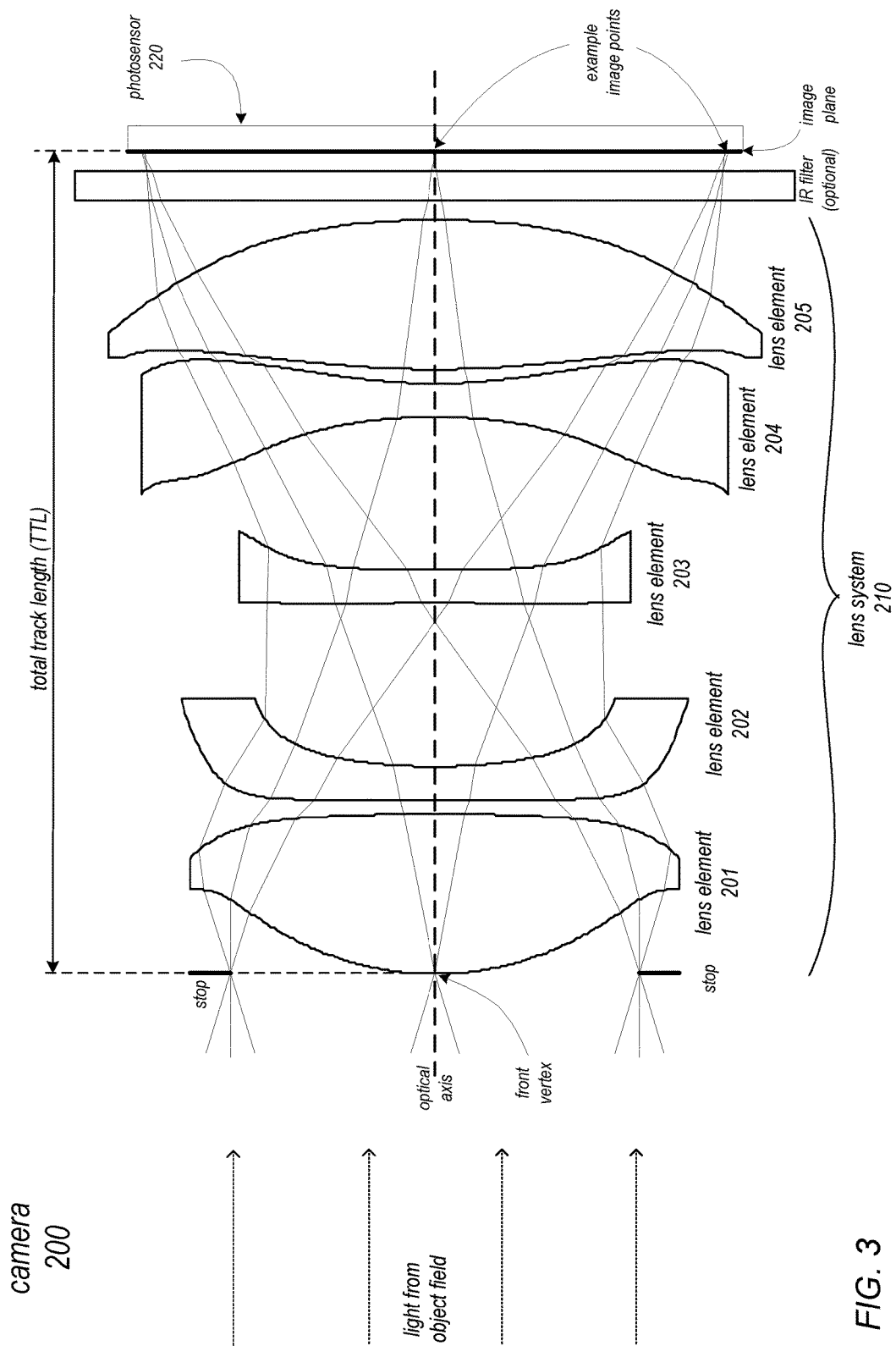
FIG. 3 is a cross-sectional illustration of another example embodiment of a compact telephoto camera including a compact telephoto lens system that includes five refractive lens elements.
Figure 5:
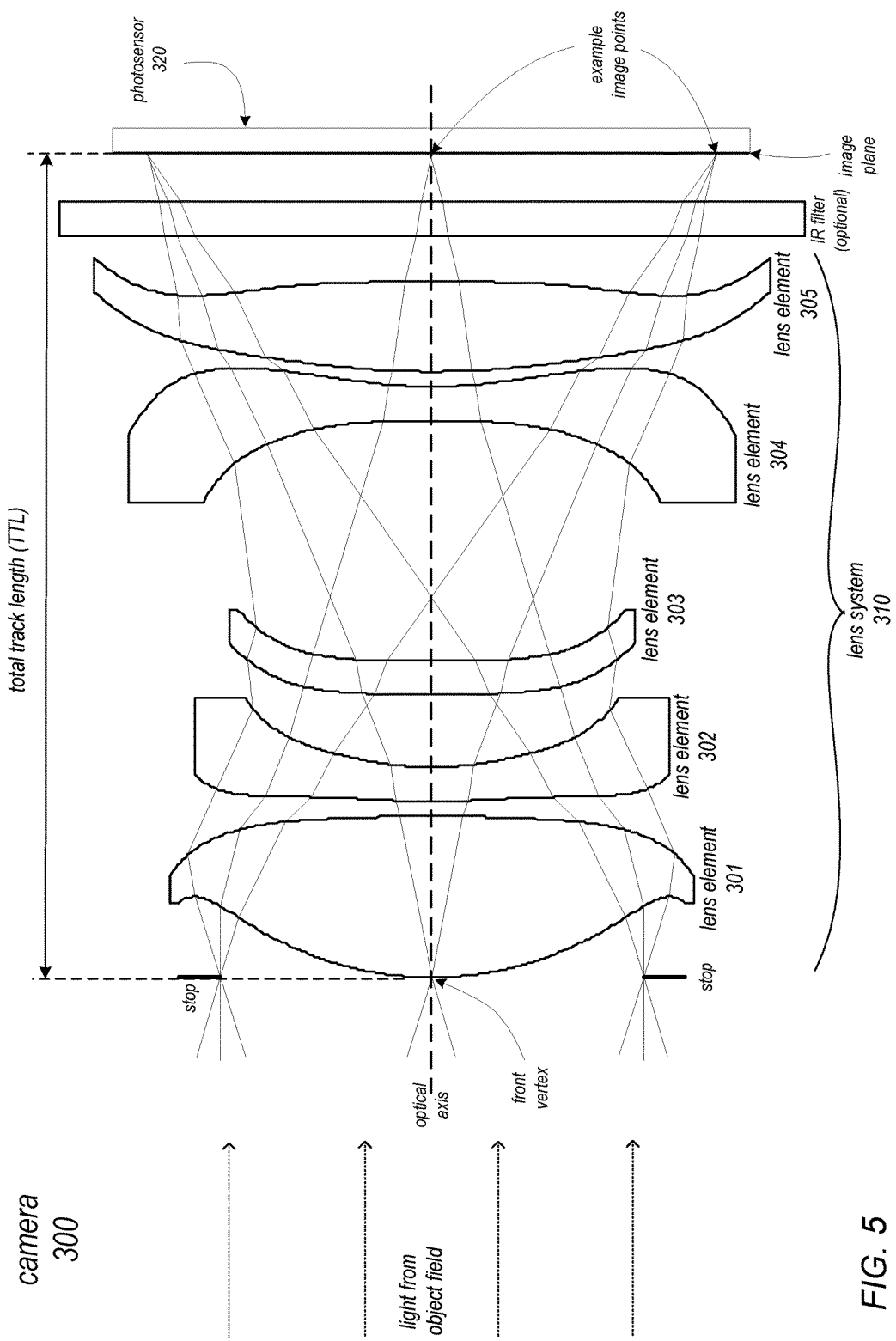
FIG. 5 is a cross-sectional illustration of another example embodiment of a compact telephoto camera including a compact telephoto lens system that includes five lens elements with refractive power.
Figure 7:
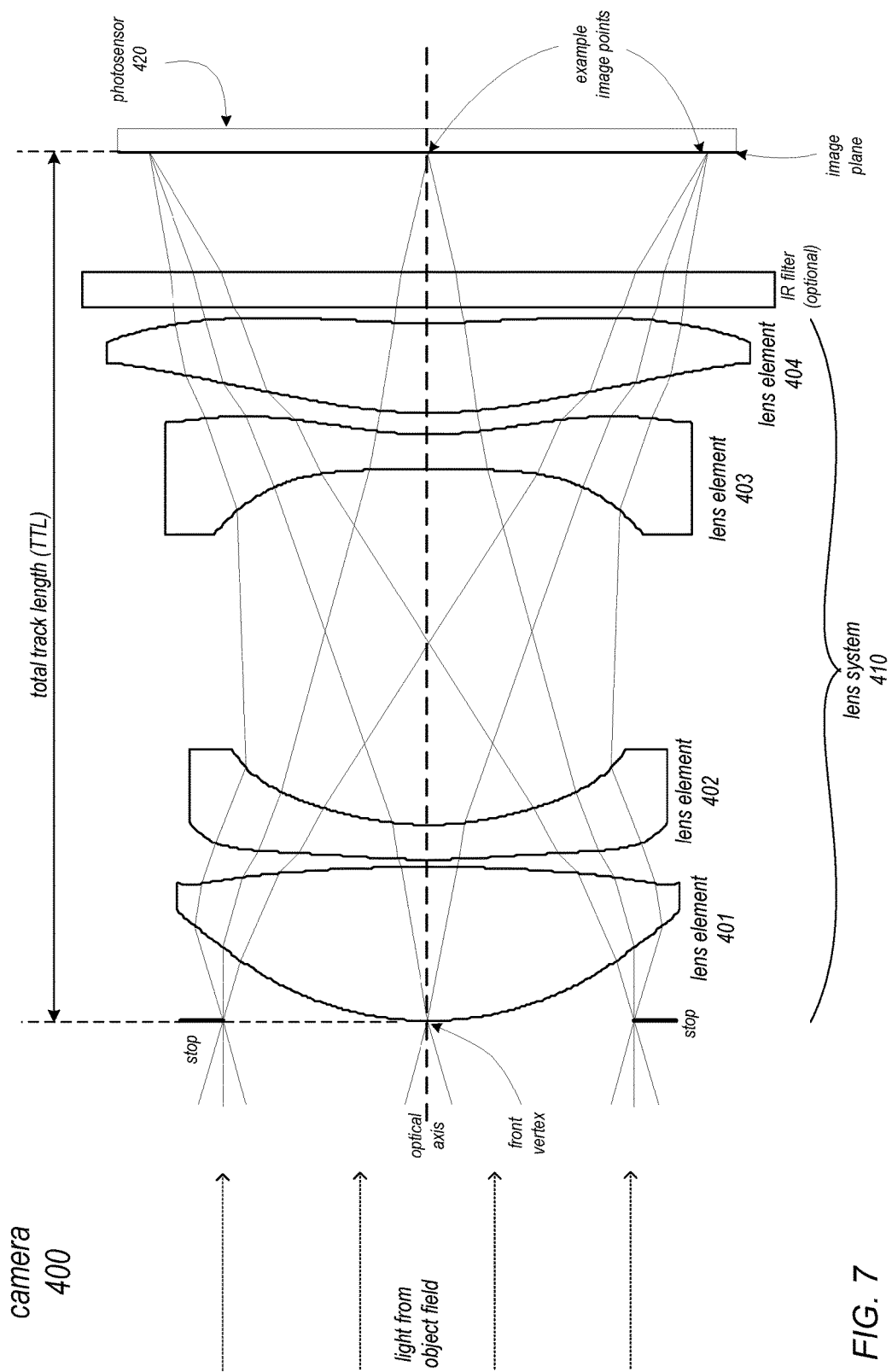
FIG. 7 is a cross-sectional illustration of an example embodiment of a compact telephoto camera including a compact telephoto lens system that includes four lens elements with refractive power.
Figure 11:
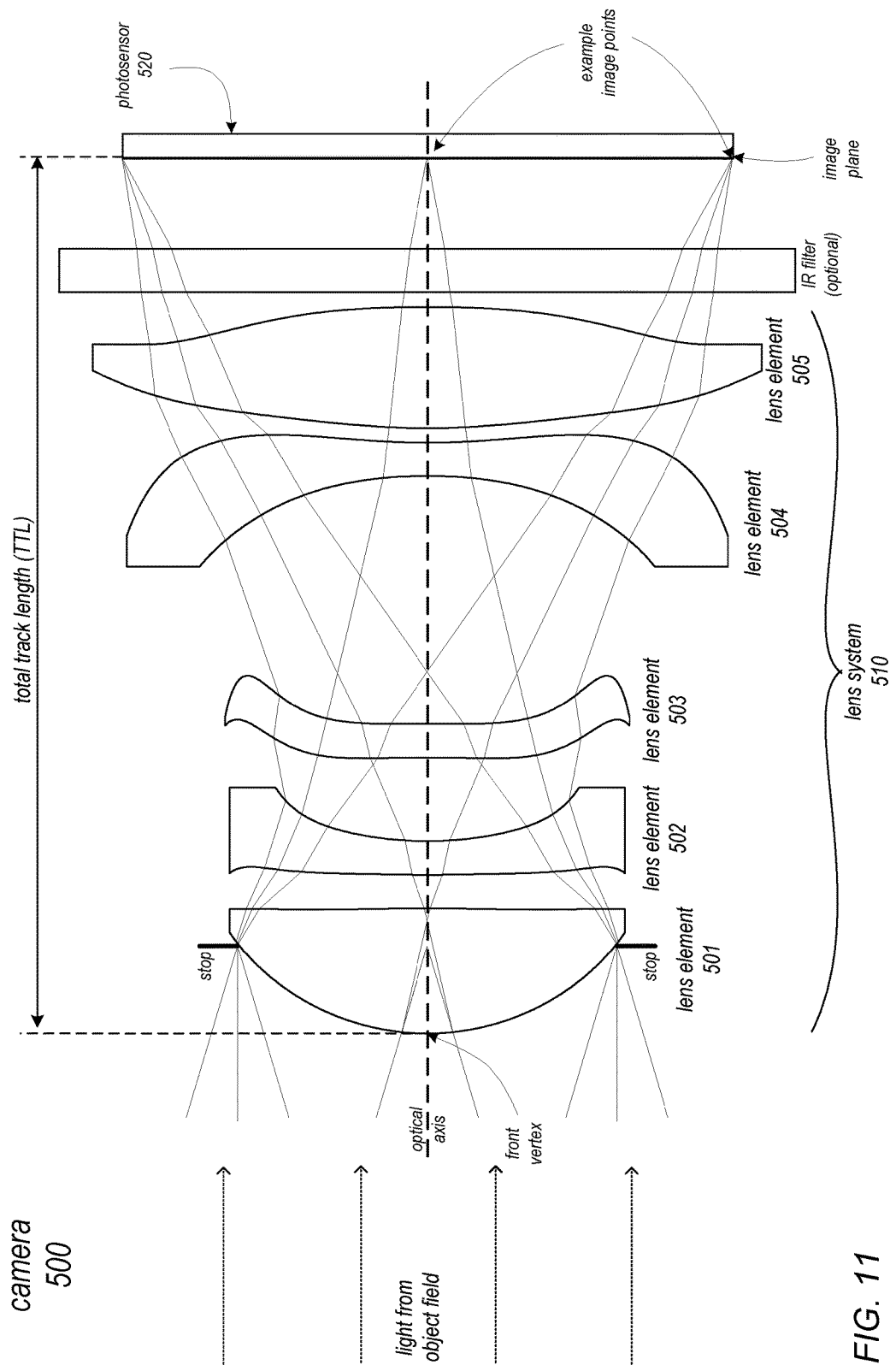
FIG. 11 is a cross-sectional illustration of an example embodiment of a compact telephoto camera including a compact telephoto lens system that includes five lens elements with refractive power in which the aperture stop is located at the first lens element and behind the front vertex of the lens system.
Figure 13:
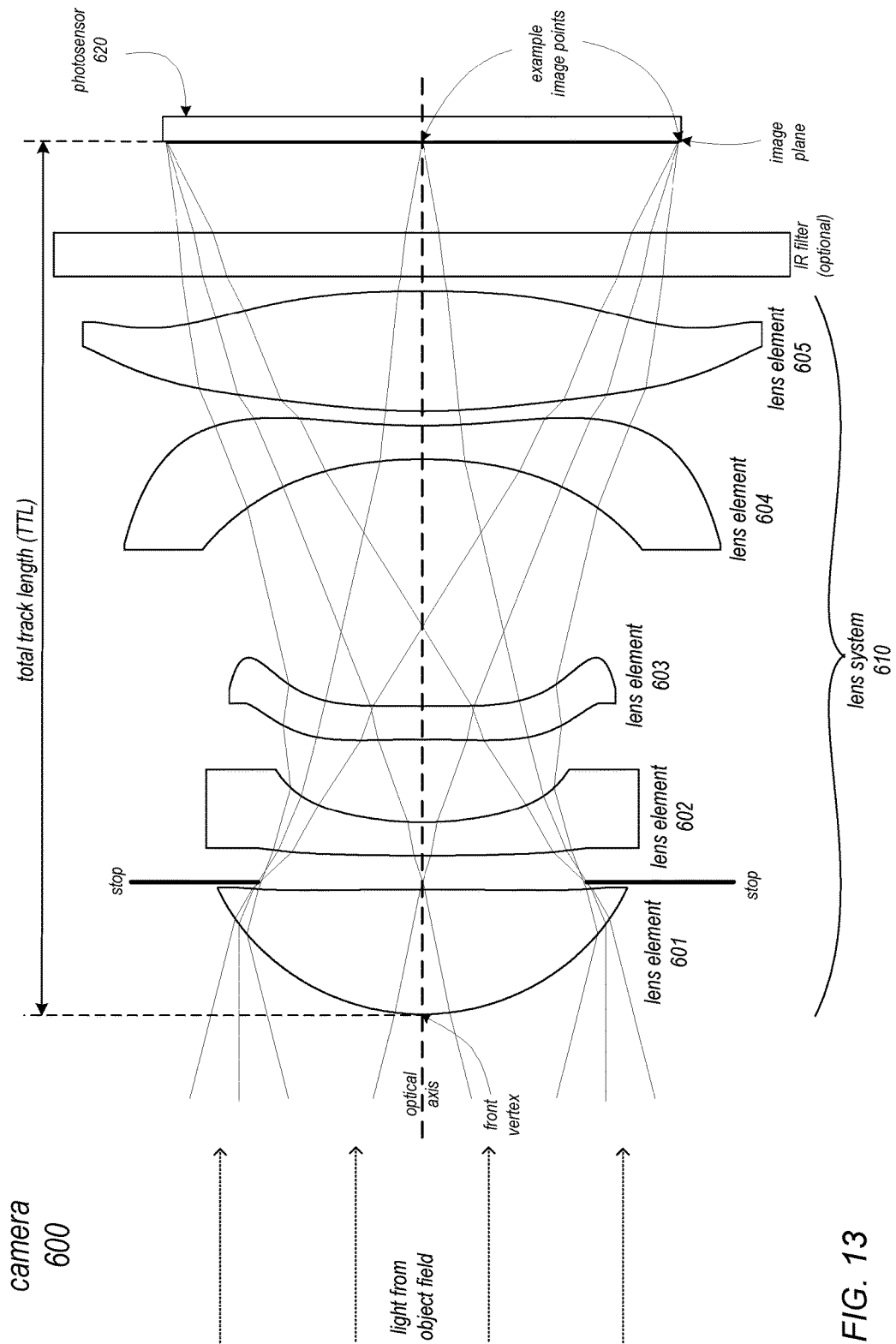
FIG. 13 is a cross-sectional illustration of an example embodiment of a compact telephoto camera including a compact telephoto lens system that includes five lens elements with refractive power in which the aperture stop is located between the first and second lens elements.

Several example embodiments of compact telephoto lens systems are described, including embodiments with five refracting lens elements and embodiments with four refracting lens elements. FIGS. 1 and 3 show variations on an example embodiment that includes five refracting lens elements. FIG. 5 shows another example embodiment that includes five refracting lens elements. FIG. 7 shows an example of an embodiment that includes four refracting lens elements. FIGS. 11 and 13 show example embodiments with five refracting lens elements in which the aperture stop is located differently than in the embodiments of FIGS. 1, 3, and 5. Note, however, that these examples are not intended to be limiting, and that variations on the various parameters given for the lens systems are possible while still achieving similar results. For example, variations on the embodiment that includes four refracting lens elements shown in FIG. 7 are described.

The refractive lens elements in the various embodiments may be composed of a plastic material. In at least some embodiments, the refractive lens elements may be composed of an injection molded plastic material. However, other transparent materials may be used. Also note that, in a given embodiment, different ones of the lens elements may be composed of materials with different optical characteristics, for example different Abbe numbers and/or different refractive indices.

Small Form Factor Telephoto Camera

In each of FIGS. 1, 3, 5, 7, 11, and 13, an example camera includes at least a compact telephoto lens system and a photosensor. The photosensor may be an integrated circuit (IC) technology chip or chips implemented according to any of various types of photosensor technology. Examples of photosensor technology that may be used are charge-coupled device (CCD) technology and complementary metal-oxide-semiconductor (CMOS) technology. In at least some embodiments, pixel size of the photosensor may be 1.2 microns or less, although larger pixel sizes may be used. In a non-limiting example embodiment, the photosensor may be manufactured according to a 1280×720 pixel image format to capture 1 megapixel images. However, other pixel formats may be used in embodiments, for example 5 megapixel, 10 megapixel, or larger or smaller formats.

The camera may also include a frontal aperture stop (AS) located in front of (i.e., on the object side of) a first lens element. While FIGS. 1, 3, 5, and 7 show the frontal aperture stop located at or near the front vertex of the lens system, location of the aperture stop may be closer to or farther away from the first lens element. Further, in some embodiments, the aperture stop may be located elsewhere in the telephoto lens system. For example, the aperture stop may be located at the first lens element but behind the front vertex of the lens system as shown in FIG. 11, or between the first and second lens elements as shown in FIG. 13.

The camera may also, but does not necessarily, include an infrared (IR) filter located between a last lens element of the telephoto lens system and the photosensor. The IR filter may, for example, be composed of a glass material. However, other materials may be used. Note that the IR filter does not affect the effective focal length f of the telephoto lens system. Further note that the camera may also include other components than those illustrated and described herein.

In the camera, the telephoto lens system forms an image at an image plane (IP) at or near the surface of the photosensor. The image size for a distant object is directly proportional to the effective focal length f of a lens system. The total track length (TTL) of the telephoto lens system is the distance on the optical axis (AX) between the front vertex at the object side surface of the first (object side) lens element and the image plane. For a telephoto lens system, the total track length (TTL) is less than the lens system effective focal length (f), and the ratio of total track length to focal length (TTL/f) is the telephoto ratio. To be classified as a telephoto lens system, TTL/f is less than or equal to 1.

In at least some embodiments, the telephoto lens system may be a fixed telephoto lens system configured such that the effective focal length f of the lens system is at or about 7.0 millimeters (mm) (e.g., within a range of 6.0-8.0 mm), the F-number (focal ratio, or f/#) is within a range from about 2.4 to about 10.0, the field of view (FOV) is at or about 36 degrees (although narrower or wider FOVs may be achieved), and the total track length (TTL) of the lens system is within a range of about 5.2 to about 7.0 mm. More generally, the telephoto lens system may be configured such that that the telephoto ratio (TTL/f) satisfies the relation:

$0.74 < TTL/f < 1.0$.

In the example embodiments described herein (see FIGS. 1, 3, 5, 7, 11, and 13), the telephoto lens system may be configured such that the effective focal length f of the lens system is 7.0 mm at reference wavelength 555 nm, and the F-number is 2.8. The lens system may, for example, be configured with a focal length f of 7.0 mm and F-number of 2.8 to satisfy specified optical, imaging, and/or packaging constraints for particular camera system applications. Note that the F-number, also referred to as the focal ratio or f/#, is defined by f/D, where D is the diameter of the entrance pupil, i.e. the effective aperture. As an example, at f=7.0 mm, an F-number of 2.8 is achieved with an effective aperture of 2.5 mm. The example embodiment may also be configured with a field of view (FOV) at or about 36 degrees. Total track length (TTL) of the example embodiments vary from about 5.6 mm to about 6.0 mm. Telephoto ratio (TTL/f) thus varies within the range of about 0.8 to about 0.857.

However, note that the focal length f, F-number, and/or other parameters may be scaled or adjusted to meet various specifications of optical, imaging, and/or packaging constraints for other camera system applications. Constraints for a camera system that may be specified as requirements for particular camera system applications and/or that may be varied for different camera system applications include but are not limited to the focal length f effective aperture, F-number, field of view (FOV), imaging performance requirements, and packaging volume or size constraints.

In some embodiments, the telephoto lens system may be adjustable. For example, in some embodiments, a telephoto lens system as described herein may be equipped with an adjustable iris (entrance pupil) or aperture stop. Using an adjustable aperture stop, the F-number (focal ratio, or f/#) may be dynamically varied within a range. For example, if the lens system is well corrected at f/2.8, at a given focal length f and FOV, then the focal ratio may be varied within the range of 2.8 to 10 (or higher) by adjusting the aperture stop assuming that the aperture stop can be adjusted to the F-number setting. In some embodiments, the lens system may be used at faster focal ratios (f/#<2.8) by adjusting the aperture stop, with degraded image quality performance at the same FOV (e.g. 36 degrees), or with reasonably good performance at a smaller FOV.

While ranges of values may be given herein as examples for adjustable cameras and lens systems in which one or more optical parameters may be dynamically varied (e.g., using an adjustable aperture stop), embodiments of camera systems that include fixed (non-adjustable) telephoto lens systems in which values for optical and other parameters are within these ranges may be implemented.

Referring first to embodiments as illustrated in FIGS. 1, 3, 11, and 13 a compact telephoto lens system (110, 210, 510, or 610) of a camera (100, 200, 500, or 600) may include five lens elements (101-105 in lens system 110 of FIG. 1, 201-205 in lens system 210 of FIG. 3, 501-505 in lens system 510, 601-605 in lens system 610) with refractive power and lens system effective focal length f, arranged along an optical axis AX in order from an object side to an image side:

a first lens element L1 (101, 201, 501, or 601) with positive refractive power having a convex object side surface;

a second lens element L2 (102, 202, 502, or 602) with negative refractive power having either a convex or concave object side surface;

a third lens element L3 (103, 203, 503, or 603) with negative refractive power having a concave object side surface;

a fourth lens element L4 (104, 204, 504, or 604) with negative refractive power having a concave object side surface; and a fifth lens element L5 (105, 205, 505, or 605) with positive refractive power having a convex image side surface.

In addition, at least one of the object side and image side surfaces of the five lens elements is aspheric.

The lens systems 110, 210, 510, and 610 are configured such that that the telephoto ratio (TTL/f) satisfies the relation:

$$0.74 < TTL/f < 1.0. \qquad (1)$$

The first lens element L1 of lens systems 110, 210, 510, and 610 may have positive refractive power and length f1 and may satisfy the relation $$0.35 < f1/f < 0.45. \qquad (2)$$

In at least some embodiments of lens systems 110, 210, 510, and 610, L1 may be biconvex in shape with vertex radii of curvature R2 and R3 and with a shape satisfying the condition, $$-0.35 < R2/R3 < 0, \qquad (3)$$

where R2 is an object side radius of curvature of L1 and R3 is an image side radius of curvature of L1.

The second, third, and fourth lens elements (L2, L3, and L4) of lens systems 110, 210, 510, and 610 may have negative refractive power and negative focal length f2, f3, and f4, respectively, and may satisfy the following conditions:

$$-0.7 < f2/f < -0.4, \text{ and } -5.0 < R4/R5 < 7.0, \qquad (4)$$

$$-3.5 < f3/f < -1.0, \text{ and } -15.0 < R6/R7 < 0.5, \qquad (5)$$

$$-0.6 < f4/f < -0.3, \text{ and } -2.0 < R8/R9 < -0.5, \qquad (6)$$

where:
R4 is an object side surface radius of curvature of the second lens element L2 and R5 is the radius of curvature of an image side surface of L2,
R6 is the radius of curvature of an object side surface of the third lens element L3 and R7 is the radius of curvature of an image side surface of L3, and
R8 is the radius of curvature of an object side surface of the fourth lens element L4 and R9 is the radius of curvature of an image side surface of L4.

The second lens element L2 may have a negative refractive power and may either have a negative meniscus or be biconcave in shape. An example embodiment where L2 is negative meniscus in shape and having a convex object side surface is illustrated by lens element 102 in lens system 110 of FIG. 1. An example embodiment where L2 has a concave object side surface and is biconcave in shape is illustrated by lens element 202 in lens system 210 of FIG. 3.

The fifth lens element L5 of lens systems 110, 210, 510, and 610 may have positive refractive power and positive focal length f5, and may satisfy the following conditions:

$$0.5 < f5/f < 0.8, \text{ and } -1.5 < R10/R11 < -0.5, \qquad (7)$$

where R10 is the radius of curvature of an object side surface of the fifth lens element L5 and R11 is the radius of curvature is of an image side surface of L5.

In at least some embodiments as illustrated in FIGS. 1, 3, 11, and 13, the first lens element L1 and the fourth lens element L4 may be composed of a material (e.g., a plastic material) having an Abbe number of V1. The second, third, and fifth lens elements L2, L3, and L5, may be composed of a material (e.g., a plastic material) having an Abbe number of V2. The Abbe numbers of the materials for the lens elements may satisfy the condition, $$30 < V1 - V2 < 35. \qquad (8)$$

Referring now to embodiments as illustrated in FIG. 5, a compact telephoto lens system 310 of a camera 300 may include five lens elements (301-305) with refractive power and lens system effective focal length f, arranged along an optical axis AX in order from an object side to an image side:

a first lens element L1 (301) with positive refractive power having a convex object side surface;

a second lens element L2 (302) with negative refractive power having a convex object side surface;

a third lens element L3 (303) with positive refractive power having a convex object side surface;

a fourth lens element L4 (304) with negative refractive power having a concave object side surface; and a fifth lens element L5 (305) with positive refractive power having a convex image side surface.

In addition, at least one of the object side and image side surfaces of the five lens elements is aspheric.

The lens system 310 is configured such that the telephoto ratio (TTL/f) satisfies the relation:

$$0.74 < TTL/f < 1.0. \qquad (1)$$

Lens system 310 of FIG. 5 differs from lens systems 110 and 210 of FIGS. 1 and 3 in at least the following aspect. The third lens element L3 (303) of lens system 310 has positive refractive power or positive focal length f3. The positive lens element L3 has vertex radii of curvature R6 and R7, and satisfies the conditions $$R6 < R7, \text{ and } 0 < R6/R7 < 1.0, \qquad (9)$$

where R6 is the radius of curvature of an object side surface of the third lens element L3 and R7 is the radius of curvature of an image side surface of L3. The lens element L3 is a positive meniscus in shape and has a convex object side surface.

In lens system 310, the first lens element L1 (301) may have positive refractive power and length f1, and may satisfy the relation $$0.35 < f1/f < 0.45. \qquad (2)$$

In at least some embodiments, L1 may be biconvex in shape with vertex radii of curvature R2 and R3 and with a shape satisfying condition, $$-0.35 < R2/R3 < 0, \qquad (3)$$

where R2 is an object side radius of curvature of L1 and R3 is an image side radius of curvature of L1.

In lens system 310, the second lens element L2 (302) may have negative refractive power and negative focal length f2, an object side surface radius of curvature R4 and an image side surface radius of curvature R5, and may satisfy the conditions $$-0.7 < f2/f < -0.4, \text{ and } 0 < R4/R5 < 6.0. \qquad (10)$$

In lens system 310, the fourth lens element L4 (304) may have negative refractive power and negative focal length f4, and may satisfy the conditions $$-0.6 < f4/f < -0.3, \text{ and } -3.0 < R8/R9 < 0, \qquad (11)$$

where R8 is an object side surface radius of curvature of lens element L4 and R9 is the radius of curvature of an image side surface of L4.

In lens system 310, the fifth lens element L5 (305) may have positive refractive power and positive focal length f5, may have a convex image side surface, and may satisfy the following conditions:

$$0.75 < f5/f < 1.2 \text{ and } -1 < R10/R11 < 0, \quad (12)$$

where R10 is the radius of curvature of an object side surface of the fifth lens element L5 and R11 is the radius of curvature of an image side surface of L5.

In at least some embodiments of lens system 310, the first lens element L1 and fourth lens element L4 may be composed of a material (e.g., a plastic material) having an Abbe number of V1. The second, third, and fifth lens elements L2, L3, and L5, may be composed of a material (e.g., a plastic material) having an Abbe number of V2. The Abbe numbers of the materials for the lens elements may satisfy the condition, $$30 < V1 - V2 < 35. \quad (8)$$

Referring now to embodiments as illustrated in FIG. 7, a compact telephoto lens system 410 of a camera 400 may include four lens elements (401-404) with refractive power and lens system effective focal length f, arranged along an optical axis AX in order from an object side to an image side:
- a first lens element L1 (401) with positive refractive power having a convex object side surface;
- a second lens element L2 (402) with negative refractive power;
- a third lens element L3 (403) with negative refractive power; and
- a fourth lens element L4 (404) with positive refractive power having a convex object side surface.

In addition, at least one of the object side and image side surfaces of the four lens elements is aspheric.

The lens system 410 is configured such that the telephoto ratio (TTL/f) satisfies the relation:

$$0.74 < TTL/f < 1.0. \quad (1)$$

In lens system 410, the first lens element L1 (401) may have positive refractive power and length f1 and may satisfy the relation $$0.35 < f1/f < 0.45. \quad (2)$$

In at least some embodiments of lens system 410, L1 may be biconvex in shape with vertex radii of curvature R2 and R3, and may satisfy the condition, $$-0.35 < R2/R3 < 0, \quad (3)$$

where R2 is an object side radius of curvature of L1 and R3 is an image side radius of curvature of L1.

In lens system 410, the second lens element L2 (402) may have negative refractive power and negative focal length f2, may have an object side surface radius of curvature R4 and an image side surface radius of curvature R5, and may satisfy the conditions $$-0.7 < f2/f < -0.4, \text{ and } 0 < R4/R5 < 6.0. \quad (10)$$

In at least some embodiments, the lens element L2 may have a convex object side radius of curvature R4 and a concave image side radius of curvature R5.

In lens system 410, the third lens element L3 (403) may have negative refractive power and negative focal length f3, may have an object side surface radius of curvature R6 and an image side surface radius of curvature R7, and may satisfy the conditions $$-0.7 < f3/f < -0.4, \text{ and } -500 < R6/R7 < 20. \quad (13)$$

In various embodiments, the element L3 may have either a concave or convex object side radius of curvature R6 and a concave image side radius of curvature R7. In at least some embodiments, lens element L2 and L3 may be spaced apart by an axial distance T5.

In lens system 410, the fourth lens element L4 (404) may have positive refractive power and positive focal length f4, and may satisfy the following conditions, $$0.8 < f4/f < 1.5, \text{ and } 0.0 < R8/R9 < 1.0, \quad (14)$$

where R8 is an object side surface radius of curvature of lens element L4 and R9 is the radius of curvature of an image side surface of L4.

In at least some embodiments of lens system 410, the first lens element L1 and third lens element L3 may be composed of a material (e.g., a plastic material) having an Abbe number of V1. The second lens element L2 and fourth lens element L4 may be composed of a material (e.g., a plastic material) having an Abbe number of V2. The Abbe numbers of the materials for the lens elements satisfy the condition, $$30 < V1 - V2 < 35. \quad (8)$$

In at least some embodiments of lens system 410, the lens elements L1 and L2 may be arranged in close proximity such that the combination of L1 and L2 may be considered as an air-spaced doublet lens L12 of positive refractive power or positive focal length f12. In at least some embodiments of lens system 410, the lens elements L3 and L4 may be arranged in close proximity such that the combination of L3 and L4 may be considered as a doublet lens L34 having negative refractive power and negative focal length of f34. The axial separation between L12 and L34 may be given by T5.

Compact Telephoto Lens System

The following provides further details of various embodiments of a compact telephoto lens system that may be used in a small form factor telephoto camera in reference to FIGS. 1 through 10.

FIG. 1 is a cross-sectional illustration of an example embodiment of a compact telephoto camera 100 including a compact telephoto lens system 110. Lens system 110 includes five lens elements (101-105) with refractive power. Arranged along an optical axis AX of the camera 100 from an object side to an image side (from left to right in the drawing) are an aperture stop AS, a first lens element L1 (101) with positive refractive power having a convex object side surface and focal length f1, a second lens element L2 (102) with negative refractive power having a convex object side surface and focal length f2, a third lens element L3 (103) with negative refractive power having a concave object side surface and focal length f3, a fourth lens element L4 (104) with negative refractive power having a concave object side surface and focal length f4, and a fifth lens element L5 (105) with positive refractive power having a convex image side surface and focal length f5. The lens system 110 forms an image plane at a surface of a photosensor 120. In some embodiments, an infrared (IR) filter may be located between the fifth lens element L5 and the photosensor 120.

Effective focal length of the lens system 110 is given as f. The total track length (TTL) of the compact telephoto lens system 110 is the distance on the optical axis AX between the object side surface of the first lens element L1 and the image plane. The lens system 110 is configured such that the telephoto ratio (TTL/f) of the lens system 110 satisfies the relation:

$$0.74 < TTL/f < 1.0.$$

An aperture stop AS, which may be located at the front surface of lens element L1, determines the entrance pupil aperture of lens system 110. The lens system 110 focal ratio or f-number f# is defined as the lens system 110 effective focal length f divided by the entrance pupil diameter. The IR filter may act to block infrared radiation that could damage or adversely affect the photosensor, and may be configured so as to have no effect on f.

Tables 1A-1C provide example values for various optical and physical parameters of an example embodiment of a camera 100 and lens system 110 as illustrated in FIG. 1. Tables 1A-1C may be referred to as providing an optical prescription for the lens system 110.

Referring to Tables 1A-1C, embodiments of lens system 110 cover applications in the visible region of the spectrum from 470 nanometers (nm) to 650 nm with reference wavelength at 555 nm. The lens system 110 effective focal length f shown in Table 1A is at 555 nm. The optical prescription in Tables 1A-1C provides high image quality performance at f/2.8 over the 470 nm to 650 nm spectrum, for an effective focal length f of 7 millimeters (mm), covering 36 degrees field of view (FOV) (18 degrees half FOV). The compact lens system 110, illustrated in FIG. 1 and with optical prescription as shown in Tables 1A-1C, has a total track length (TTL) of 5.7 mm, and a telephoto ratio (TTL/f) of 0.814.

Figure 2:
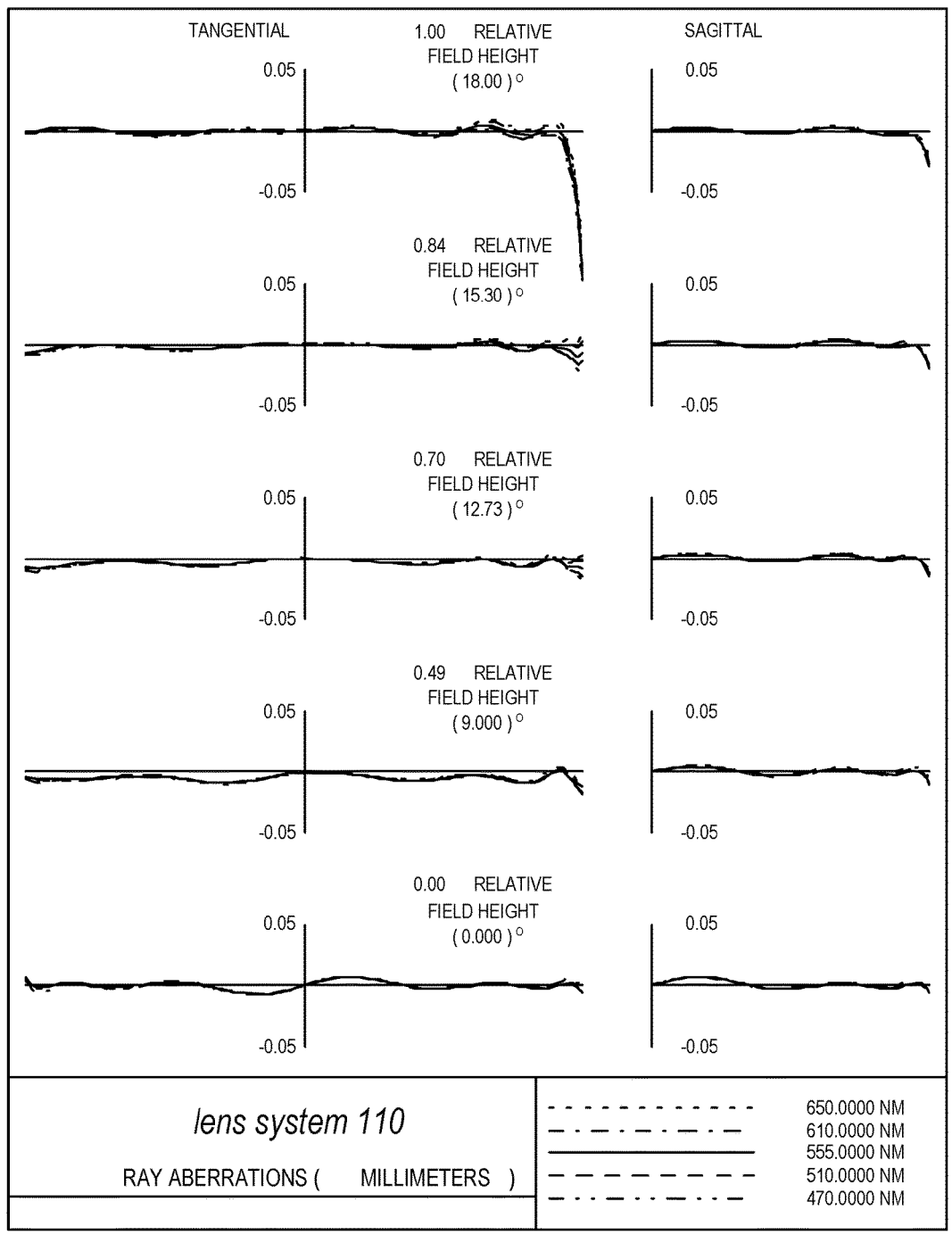
FIG. 2 illustrates a plot of the polychromatic ray aberration curves over the half field of view and over the visible spectral band ranging from 470 nm to 650 nm for a compact telephoto lens system as illustrated in FIG. 1.

The five lens elements L1, L2, L3, L4, and L5 of lens system 110 may be composed of plastic materials with refractive indices and Abbe numbers as listed in Table 1B. As shown in Table 1B, in at least some embodiments of lens system 110, two types of plastic materials may be used for the lens elements. Lens elements L1 and L4 may be composed of the same plastic material with an Abbe number V1 of 56.1, and lens elements L2, L3, and may be composed of another plastic material with an Abbe number V2 of 23.3. Lens element L5, having positive refractive power, is formed from plastic material with an Abbe number V2=23.3. The application of these two plastic materials for the lens elements in lens system 110 enables lens system 110 to be optimized and corrected for chromatic aberrations over the visible spectral region. The lens element materials may be chosen and the refractive power distribution of the lens elements may be calculated to satisfy the effective focal length f and correction of the field curvature or Petzval sum. The monochromatic and chromatic variations of optical aberrations may be reduced by adjusting the radii of curvature and aspheric coefficients or geometrical shapes of the lens elements and axial separations as illustrated in Table 1C to produce well corrected and balanced minimal residual aberrations. FIG. 2 illustrates a plot of the polychromatic ray aberration curves over the half field of view (HFOV=18 degrees) and over the visible spectral band ranging from 470 nm to 650 nm for a compact telephoto lens system 110 as illustrated in FIG. 1 and described in Tables 1A-1C.

The optical prescription in Tables 1A-1C describes an example embodiment of a compact telephoto lens system 110 as illustrated in FIG. 1 that includes five lens elements with refractive power and effective focal length f, and in which a second lens element L2 has negative refractive power or negative focal length f2 and a convex object side surface. In addition, lens element L2 of lens system 110 is negative meniscus in shape and has positive radii of curvature R4 and R5, where R4>R5, and R4/R5>1.0.

In the example embodiment of lens system 110 as described by the optical prescription in Tables 1A-1C, the refractive powers of the lens elements are distributed such that f1=2.713 mm, f2=−3.862 mm, f3=−21.521 mm, f4= −3.176 mm, and f5=4.898 mm. Lens element L1 is a biconvex lens with radii of curvature R2/R3=−0.172, and L2 has radii of curvature R4/R5=5.772. Lens elements L3 and L4 are both biconcave in shape with radii of curvature R6/R7=−14.564 and R8/R9=−1.578, respectively. Lens element L5 is biconvex in shape with radii of curvature R10/R11=−0.604. The aspheric coefficients for the surfaces of the lens elements in lens system 110 in the example embodiment are listed in Table 1C. Configuring lens system 110 according to the arrangement of the power distribution of the lens elements, and adjusting the radii of curvature and aspheric coefficients as shown in Tables 1A-1C, the total track length (TTL) of the lens system 110 may be reduced (e.g., to 5.7 mm as shown in Table 1A) and aberration of the system may effectively be corrected to obtain optical performance of high image quality resolution in a small form factor telephoto camera 100.

FIG. 3 is a cross-sectional illustration of an example embodiment of a compact telephoto camera 200 including a compact telephoto lens system 210. Lens system 210 includes five lens elements (201-205) with refractive power. Lens system 210 may be viewed as a variation of lens system 110 of FIG. 1 and elements of the two lens systems 210 and 110 may be similar. However, in lens system 210, the second lens element L2 (202) has negative refractive power or negative focal length f2 and has a concave object side surface.

Tables 2A-2C provide example values for various optical and physical parameters of an example embodiment of a camera 200 and lens system 210 as illustrated in FIG. 3. Tables 1A-1C may be referred to as providing an optical prescription for the lens system 210.

The optical prescription in Tables 2A-2C is for a lens system 210 with an effective focal length f of 7 mm at 555 nm wavelength, a focal ratio of f/2.8, with 36 degrees FOV, TTL of 5.7 mm, and with TTL/f equal to 0.814. Lens system 210 is a compact imaging lens system designed for the visible spectrum covering 470 nm to 650 nm.

The lens elements L1, L2, L3, L4, and L5 of lens system 210 may be composed of plastic materials with refractive indices and Abbe numbers as listed in Table 2B. In this example embodiment of lens system 210, the choice of lens materials are the same as in the optical prescription for lens system 110 as listed in Tables 1A-1C. Referring to lens system 210, the lens elements L1 and L4 may be composed of a plastic material having an Abbe number of V1=56.1. The lens elements L2, L3, and L5 may be composed of a plastic material with Abbe number V2=23.3.

Figure 4:
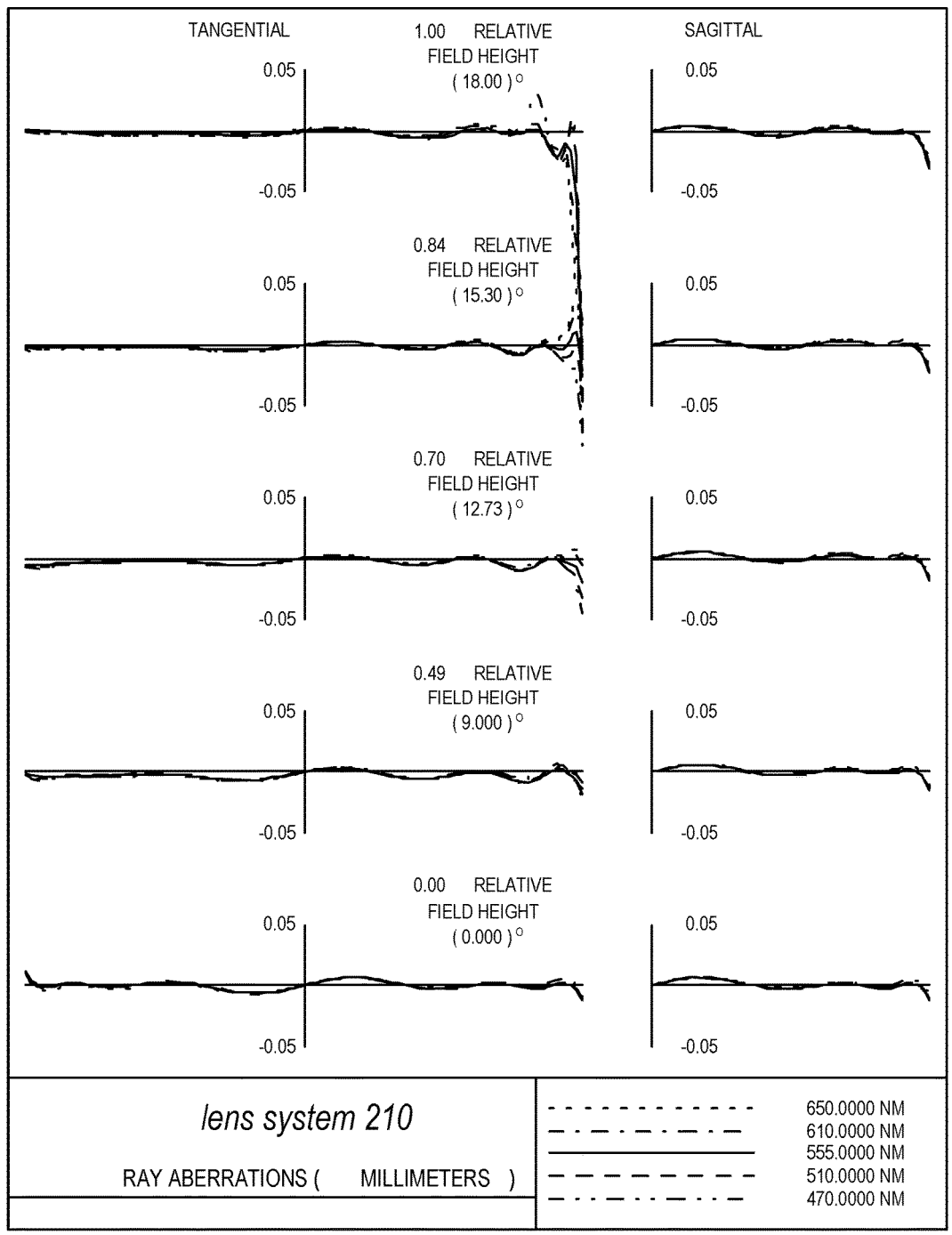
FIG. 4 illustrates a plot of the polychromatic ray aberration curves over the half field of view and over the visible spectral band ranging from 470 nm to 650 nm for a compact telephoto lens system as illustrated in FIG. 3.

Lens system 210 as specified in Tables 2A-2C is configured to correct optical aberrations as described in reference to lens system 110 and Tables 1A-1C. FIG. 4 illustrates a plot of the polychromatic ray aberration curves over the half field of view (HFOV=18 degrees), for an object field point on-axis (at 0 degree) to an off-axis field point at 18 degrees, and over the visible spectral band ranging from 470 nm to 650 nm for a compact telephoto lens system 210 as illustrated in FIG. 3 and described in Tables 2A-2C.

The optical prescriptions in Tables 2A-2C describes an example embodiment of a compact telephoto lens system 210 as illustrated in FIG. 3 that includes five lens elements with refractive power and effective focal length f, and in which a second lens element L2 has negative refractive power or negative focal length f2 and a concave object side surface. In addition, lens element L2 is biconcave in shape and has a negative radius of curvature R4 and a positive radius of curvature R5 (i.e., R4<0, R5>0, and R4/R5<0).

In the example embodiment of lens system 210 as described by the optical prescription in Tables 2A-2C, the refractive power distribution of the lens elements in terms of the focal lengths are f1=2.697 mm, f2=−4.446 mm, f3=−12.466 mm, f4=−2.684 mm and f5=4.053 mm. Lens element L1 is a biconvex lens with R2/R3=−0.183. Lens elements L2, L3, and L4 are biconcave in shape with radii of curvature R4/R5=−4.494, R6/R7=−0.606, and R8/R9=−1.20, respectively. Lens element L5 is biconvex in shape with R10/R11=−1.126. The aspheric coefficients for the surfaces of the lens elements in lens system 210 in the example embodiment are listed in Table 2C. Configuring lens system 210 according to the arrangement of the power distribution of the lens elements, and adjusting the radii of curvature and aspheric coefficients as shown in Tables 2A-2C, the total track length (TTL) of the lens system 210 may be reduced (e.g., to 5.7 mm as shown in Table 2A) and aberration of the system may effectively be corrected to obtain optical performance of high image quality resolution in a small form factor telephoto camera 200.

FIG. 5 is a cross-sectional illustration of an example embodiment of a compact telephoto camera 300 including a compact telephoto lens system 310. Lens system 310 includes five lens elements (301-305) with refractive power. Arranged along an optical axis AX of the camera 300 from an object side to an image side (from left to right in the drawing) are an aperture stop AS, a first lens element L1 (301) with positive refractive power having a convex object side surface and focal length f1, a second lens element L2 (302) with negative refractive power having a convex object side surface and focal length f2, a third lens element L3 (303) with positive refractive power having a convex object side surface and focal length f3, a fourth lens element L4 (304) with negative refractive power having a concave object side surface and focal length f4, and a fifth lens element L5 (305) with positive refractive power having a convex image side surface and focal length f5. The lens system 310 forms an image plane at a surface of a photosensor 320. In some embodiments, an infrared (IR) filter may be located between the fifth lens element L5 and the photosensor 320.

Effective focal length of the lens system 310 is given as f. The total track length (TTL) of the compact telephoto lens system 110 is the distance on the optical axis AX between the object side surface of the first lens element L1 and the image plane. The lens system 310 is configured such that the telephoto ratio (TTL/f) of the lens system 310 satisfies the relation:

$$0.74 < TTL/f < 1.0.$$

An aperture stop AS, which may be located at the front surface of lens element L1, determines the entrance pupil aperture of lens system 310. The lens system 310 focal ratio or f-number f# is defined as the lens system 310 effective focal length f divided by the entrance pupil diameter. The IR filter may act to block infrared radiation that could damage or adversely affect the photosensor, and may be configured so as to have no effect on f.

Tables 3A-3C provide example values for various optical and physical parameters of an example embodiment of a camera 300 and lens system 310 as illustrated in FIG. 5. Tables 3A-3C may be referred to as providing an optical prescription for the lens system 310.

Referring to Tables 3A-3C, embodiments of lens system 310 cover applications in the visible region of the spectrum from 470 nm to 650 nm with reference wavelength at 555 nm. The lens system 310 effective focal length f shown in Table 3A is the nominal value at 555 nm. The optical prescription in Tables 3A-3C provides high image quality performance at f/2.8 over the 470 nm to 650 nm spectrum, for an effective focal length f of 7 mm, covering a field of view (FOV) of 36 degrees. The 7 mm focal length compact lens system 310, illustrated in FIG. 5 with an optical prescription as shown in 3A-3C, has a total track length (TTL) of 5.6 mm, and a telephoto ratio (TTL/f) of 0.80.

The five lens elements L1, L2, L3, L4, and L5 of lens system 310 may be composed of plastic materials with refractive indices and Abbe numbers as listed in Table 3B. As shown in Table 3B, in at least some embodiments of lens system 310, two types of plastic materials may be used for the lens elements. Lens elements L1 and L4 may be composed of the same plastic material with an Abbe number V1=56.1, and lens elements L2, L3, and L5 may be composed of another plastic material having an Abbe number V2=23.3.

Figure 6:
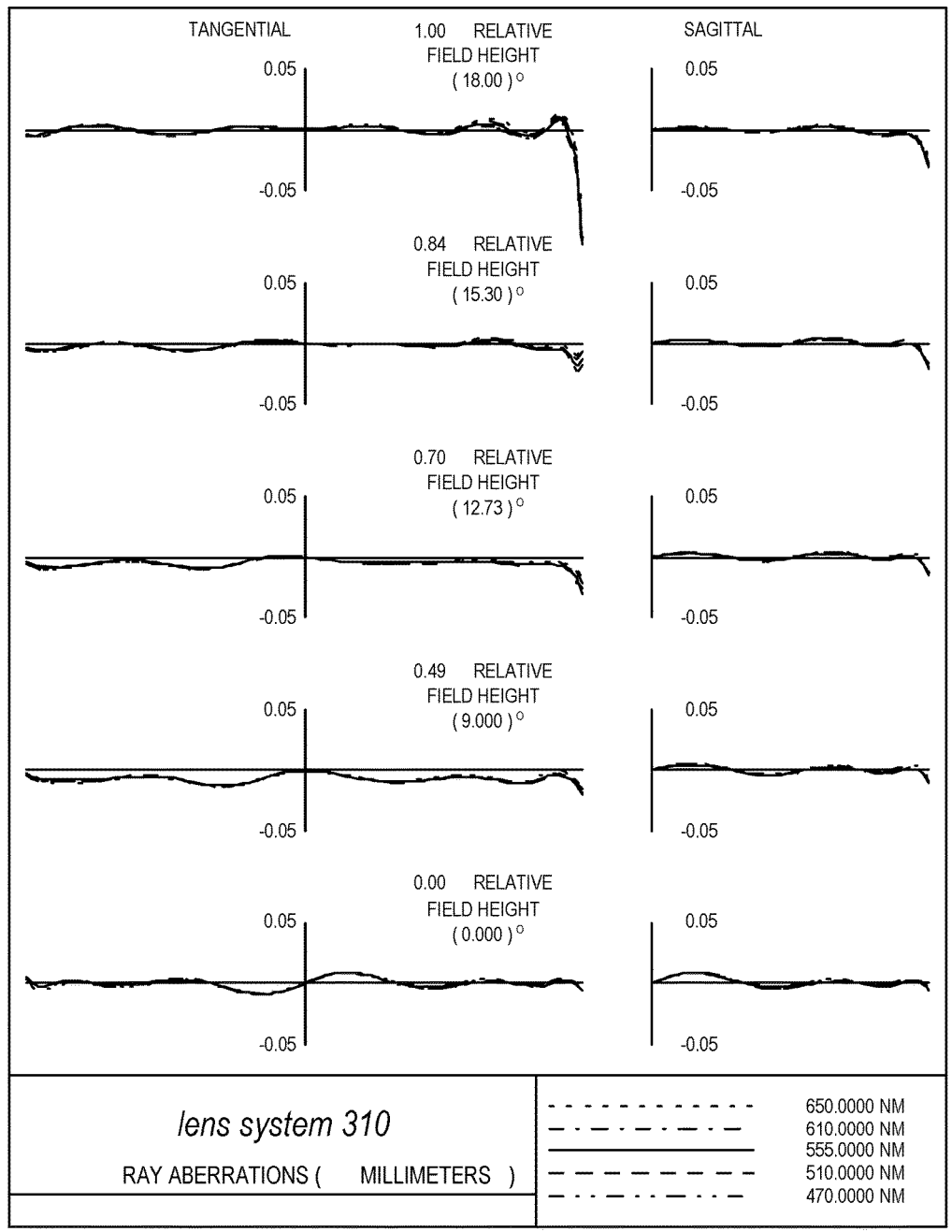
FIG. 6 illustrates a plot of the polychromatic ray aberration curves over the half field of view and over the visible spectral band ranging from 470 nm to 650 nm for a compact telephoto lens system as illustrated in FIG. 5.

Lens system 310 as specified in Tables 3A-3C is configured to correct optical aberrations as described in reference to lens system 110 and Tables 1A-1C. FIG. 6 illustrates a plot of the polychromatic ray aberration curves over the half field of view (HFOV) covering 0-18 degrees, and over the visible spectral band ranging from 470 nm to 650 nm for a compact telephoto lens system 310 as illustrated in FIG. 5 and described in Tables 3A-3C.

The optical prescriptions in Tables 3A-3C describe an example embodiment of a compact telephoto lens system 310 as illustrated in FIG. 5 that includes five lens elements with refractive power and effective focal length f in which a second lens element L2 with negative refractive power or negative focal length f2 has a convex object side surface and a third lens element L3 with positive refractive power or positive focal length f3 has a convex object side surface. In addition, in this embodiment, lens element L2 is negative meniscus in shape and has positive radii of curvature R4 and R5, with R4>R5 and R4/R5>1.0. Lens element L3 is positive meniscus in shape and has positive radii of curvature R6 and R7, with R6<R7 and 0<R6/R7<1.0.

In the example embodiment of lens system 310 as described by the optical prescription in Tables 3A-3C, the refractive power distribution of the lens elements in terms of the focal lengths are f1=2.762 mm, f2=−3.511 mm, f3=82.286 mm, f4=−3.262 mm and f5=5.759 mm. Lens elements L1 and L5 are both biconvex in shape with R2/R3=−0.206 and R10/R11=−0.148. The shape of the negative meniscus lens element L2 has radii of curvature R4/R5=3.15. Lens element L3 has positive refractive power and is positive meniscus in shape with radii of curvature R6/R7=0.739. Lens element L4 is biconcave in shape with radii of curvature R8/R9=−2.775. The aspheric coefficients for the surfaces of the compact imaging system in lens system 310 in the example embodiment are listed in Table 3C. Configuring lens system 310 according to the arrangement of the power distribution of the lens elements, and adjusting the radii of curvature and aspheric coefficients as shown in Tables 3A-3C, the total track length (TTL) of the lens system 310 may be reduced (e.g., to 5.6 mm as shown in Table 3A) and aberration of the system may effectively be corrected to obtain optical performance of high image quality resolution in a small form factor telephoto camera 300.

FIG. 7 is a cross-sectional illustration of an example embodiment of a compact telephoto camera 400 including a compact telephoto lens system 410 that includes four lens elements (401-404) with refractive power, rather than five lens elements as shown in FIGS. 1, 3, and 5. Arranged along an optical axis AX of the camera 400 from an object side to an image side (from left to right in the drawing) are an aperture stop AS, a first lens element L1 (401) with positive refractive power having a convex object side surface and focal length f1, a second lens element L2 (402) with negative refractive power and focal length f2, a third lens element L3 (403) with negative refractive power and focal length f3, and a fourth lens element L4 (404) with positive refractive power and focal length f4. The lens system 410 forms an image plane at a surface of a photosensor 420. In some embodiments, an infrared (IR) filter may be located between the fourth lens element L4 and the photosensor 420.

Effective focal length of the lens system 410 is given as f. The total track length (TTL) of the compact telephoto lens system 410 is the distance on the optical axis AX between the object side surface of the first lens element L1 and the image plane. The lens system 410 is configured such that the telephoto ratio (TTL/f) of the lens system 410 satisfies the relation:

$$0.74 < TTL/f < 1.0.$$

An aperture stop AS, which may be located at the front surface of lens element L1, determines the entrance pupil aperture of lens system 410. The lens system 410 focal ratio or f-number f# is defined as the lens system 410 effective focal length f divided by the entrance pupil diameter. The IR filter may act to block infrared radiation that could damage or adversely affect the photosensor, and may be configured so as to have no effect on f.

Tables 4A-4C provide example values for various optical and physical parameters of an example embodiment of a camera 400 and lens system 410 as illustrated in FIG. 7. Tables 4A-4C may be referred to as providing an optical prescription for the lens system 410.

Referring to Tables 4A-4C, embodiments of lens system 410 cover applications in the visible region of the spectrum from 470 nm to 650 nm with reference wavelength at 555 nm. The 7-mm effective focal length f shown in Table 4A is the nominal value at 555 nm. The optical prescriptions in Tables 4A-4C provide high image quality performance at f/2.8 over the 470 nm to 650 nm spectrum, for a lens system 410 covering a field of view (FOV) of 36 degrees. The compact lens system 410, illustrated in FIG. 7 and with optical prescription as shown in Tables 4A-4C, has a total track length (TTL) of 5.7 mm, and a telephoto ratio (TTL/f) of 0.814.

The four lens elements L1, L2, L3, and L4 of lens system 410 may be composed of plastic materials with refractive indices and Abbe numbers as listed in Table 4B. As shown in Table 4B, in at least some embodiments, two types of plastic materials may be used for the lens elements. Lens elements L1 and L3 may be composed of the same plastic material with an Abbe number V1=56.1, and lens elements L2 and L4 may be composed of another plastic material with an Abbe number V2=23.3.

Figure 8:
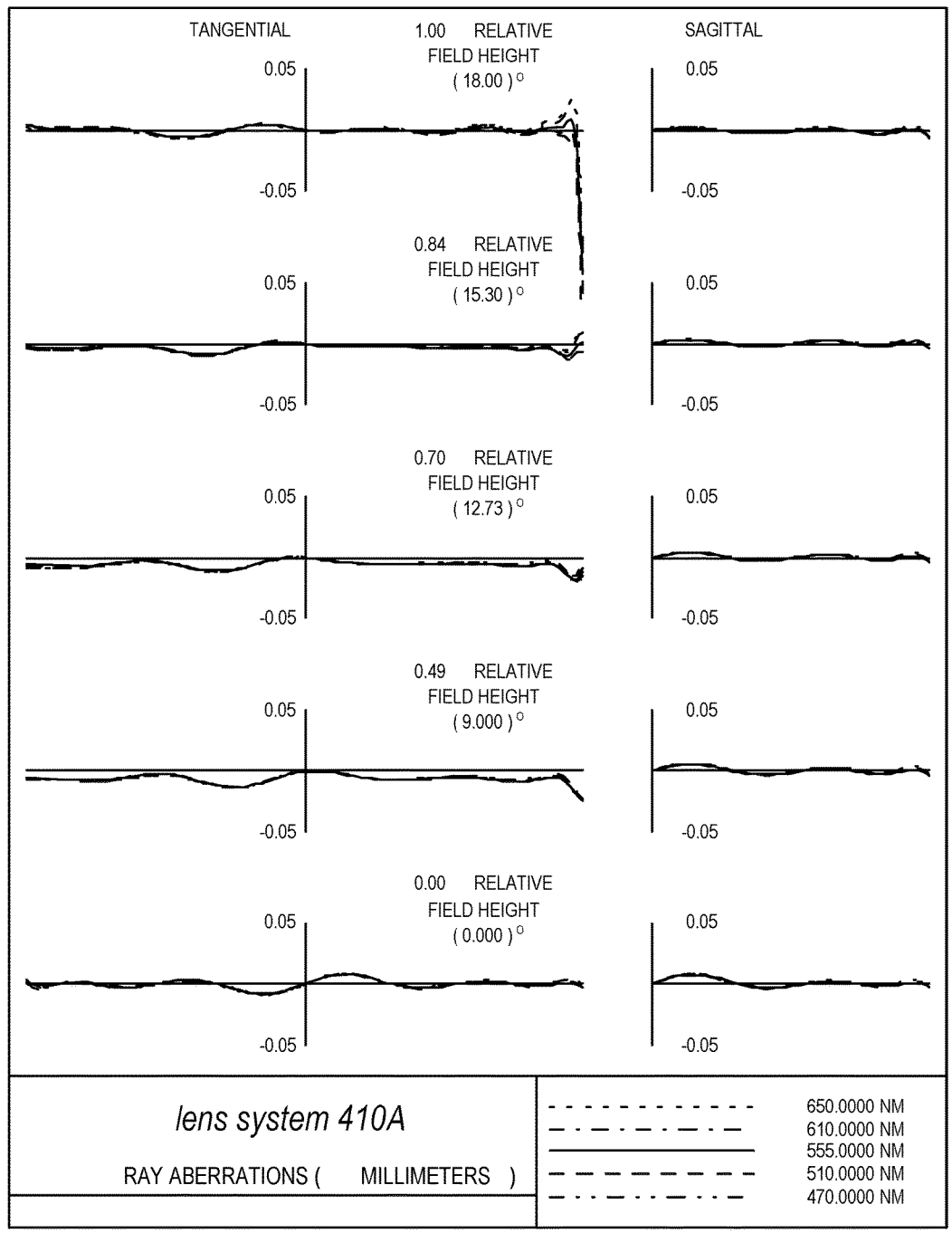
FIGS. 8, 9, and 10 show plots of the polychromatic ray aberrations curves over the half field of view (HFOV) over the visible spectral band ranging from 470 nm to 650 nm for embodiments of a compact telephoto lens system as illustrated in FIG. 7.

Lens system 410 as specified in Tables 4A-4C is configured to correct optical aberrations as described in reference to lens system 110 and Tables 1A-1C. FIG. 8 illustrates a plot of the polychromatic ray aberrations curves over the half field of view (HFOV) covering 0-18 degrees, and over the visible spectral band ranging from 470 nm to 650 nm for a compact telephoto lens system 410 as illustrated in FIG. 7 and described in Tables 4A-4C.

The optical prescriptions in Tables 4A-4C describe an example embodiment of a compact telephoto lens system 410 as illustrated in FIG. 7 that includes four lens elements with refractive power and effective focal length f in which a second lens element L2 with negative refractive power or negative focal length f2 has a convex object side surface, a third lens element L3 with negative refractive power or negative focal length f3 has a concave object side surface, and a fourth lens element L4 with positive power or positive focal length f4 has a convex object side surface. In addition, in a particular embodiment, lens element L1 is biconvex in shape, and lens element L2 is negative meniscus in shape and has positive radii of curvature R4 and R5 where R4>R5, and R4/R5>1.0. Lens element L3 is biconcave in shape, and lens element L4 is positive meniscus in shape and has positive radii of curvature R8 and R9, wherein R8<R9, and 0<R8/R9<1.0.

In the example embodiment of lens system 410 as described by the optical prescription in Tables 4A-4C, the refractive power distribution of the lens elements in terms of the focal lengths are f1=2.911 mm, f2=−4.152 mm, f3=−4.4093 mm, and f4=7.287 mm. Lens elements L1 and L2 are spaced closely such that the combination of L1 and L2 may be considered an air-spaced doublet lens of positive refractive power or positive focal length f12. Lens elements L3 and L4 are also spaced closely such that the combination of L3 and L4 may be considered a doublet lens having negative refractive power and negative focal length f34. In the example embodiment of lens system 410 as described by the optical prescription in Tables 4A-4C, f12=5.80 mm, and f34=−8.87 mm, and the two air-spaced doublets are separated by an axial distance of T5=2.3327 mm. Lens element L1 is biconvex in shape with radii of curvature R2/R3=−0.196. Negative meniscus lens element L2 has radii of curvature R4/R5=2.726. With such arrangement of radii of curvature, the combination of L1 and L2 is an air-spaced doublet of the Gaussian type. Lens element L3 is biconcave in shape with radii of curvature R6/R7=−314.045. Lens element L4 has radii of curvature R8/R9=0.479. The aspheric coefficients for the surfaces of the lens elements in this example embodiment of lens system 410 are listed in Table 4C. Configuring lens system 410 according to the arrangement of the power distribution of the lens elements, and adjusting the radii of curvature and aspheric coefficients as shown in Tables 4A-4C, the total track length (TTL) of the lens system 410 may be reduced (e.g., to 5.7 mm as shown in Table 4A) and aberration of the system may effectively be corrected to obtain optical performance of high image quality resolution in a small form factor telephoto camera 400.

Tables 5A-5C provide example values for various optical and physical parameters of an alternative example embodiment of a camera 400 and lens system 410 as illustrated in FIG. 7. Tables 5A-5C may be referred to as providing an alternative optical prescription for the lens system 410.

Figure 9:
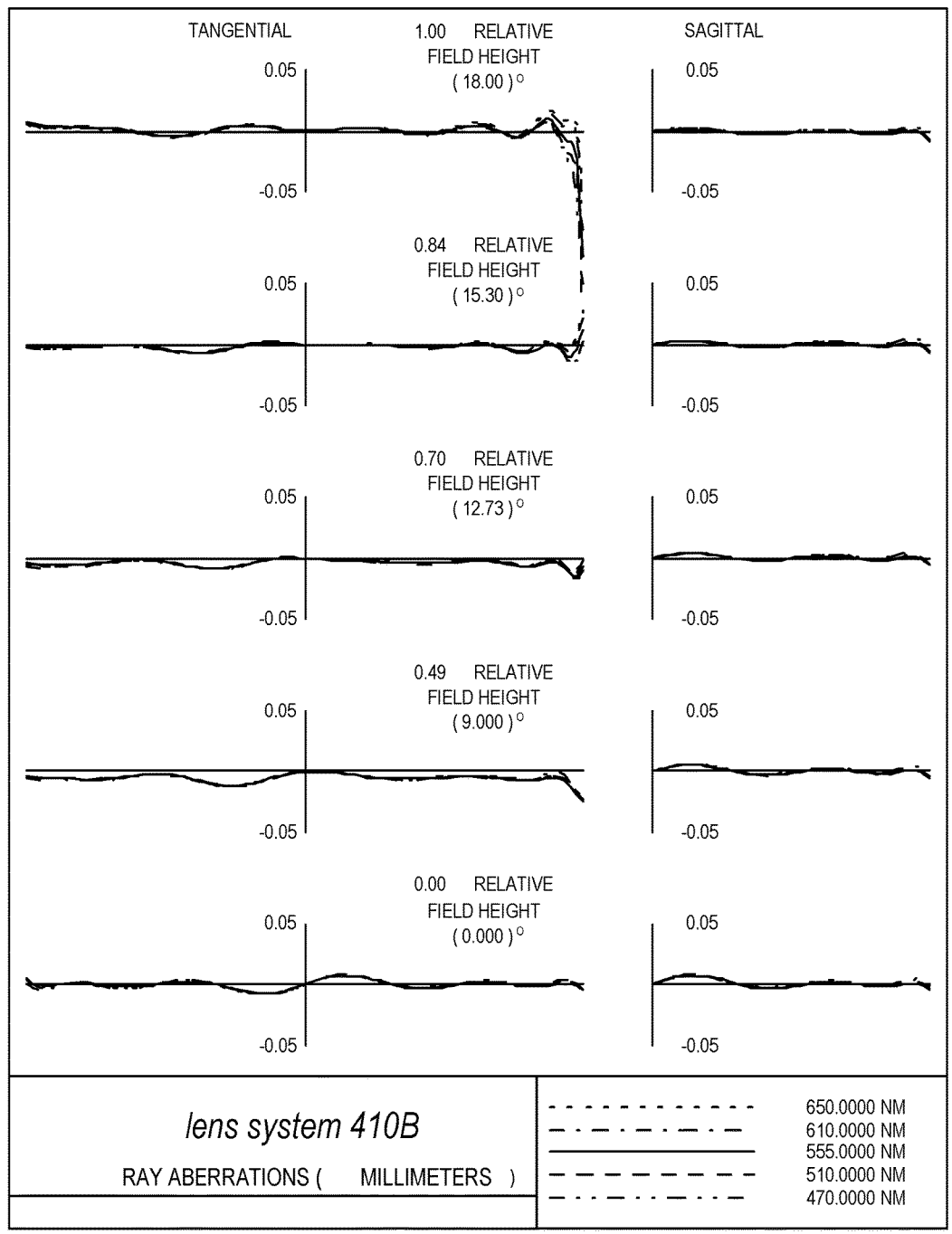

Referring to Tables 5A-5C, an embodiment of a compact telephoto lens system 410 with four lens elements as illustrated in FIG. 7 is described with 7 mm effective focal length f, f/2.6, 36 degrees FOV, 5.85 mm TTL, and TTL/f=0.836. The optical prescription in Tables 5A-5C describes an embodiment of lens system 410 in which the lens elements with negative powers and focal lengths, L2 and L3, both have a convex object surface. In this particular embodiment, L2 and L3 are both negative menisci in shape in the vicinity of the optical axis AX. The lens element L3 has positive radii of curvature R6 and R7, where R6>R7 and R6/R7>1.0. FIG. 9 illustrates a plot of the polychromatic ray aberrations curves over the half field of view (HFOV) covering 0-18 degrees, and over the visible spectral band ranging from 470 nm to 650 nm for a compact telephoto lens system 410 as illustrated in FIG. 7 and described in Tables 5A-5C.

The optical prescriptions in Tables 5A-5C describe an example embodiment of a compact telephoto lens system 410 as illustrated in FIG. 7 that includes four lens elements with refractive power and effective focal length f, in which the refractive power distribution of the lens elements L1, L2, L3, and L4 in terms of the focal lengths are f1=2.936 mm, f2=−4.025 mm, f3=−4.101 mm, and f4=6.798 mm. Lens elements L1 and L2 are spaced closely such that the combination of L1 and L2 may be considered an air-spaced doublet lens of positive refractive power or positive focal length f12. Lens elements L3 and L4 are also spaced closely such that the combination of L3 and L4 may be considered a doublet lens having negative refractive power and negative focal length of f34. In the example embodiment of lens system 410 as described by the optical prescription in Tables 5A-5C, f12=5.922 mm, and f34=−9.70 mm, and the two air-spaced doublets are separated by an axial distance of T5=2.2376 mm. Lens element L1 is biconvex in shape with R2/R3=−0.225. Negative meniscus lens element L2 has radii of curvature R4/R5=3.782. With such arrangement of radii of curvature, the combination of L1 and L2 is an air-spaced doublet of the Gaussian type. Lens element L3 is negative meniscus in shape with radii of curvature R6/R7=15.625. Lens element L4 has vertex radii of curvature R8/R9=0.462. The aspheric coefficients for the surfaces of the lens elements in this example embodiment of lens system 410 are listed in Table 5C. Configuring lens system 410 according to the arrangement of the power distribution of the lens elements, and adjusting the radii of curvature and aspheric coefficients as shown in Tables 5A-5C, the total track length (TTL) of the lens system 410 may be reduced (e.g., to 5.85 mm as shown in Table 5A) and aberration of the system may effectively be corrected to obtain optical performance of high image quality resolution in a small form factor telephoto camera 400.

Tables 6A-6C provide example values for various optical and physical parameters of another alternative example embodiment of a camera 400 and lens system 410 as illustrated in FIG. 7. Tables 6A-6C may be referred to as providing another alternative optical prescription for the lens system 410.

Figure 10:
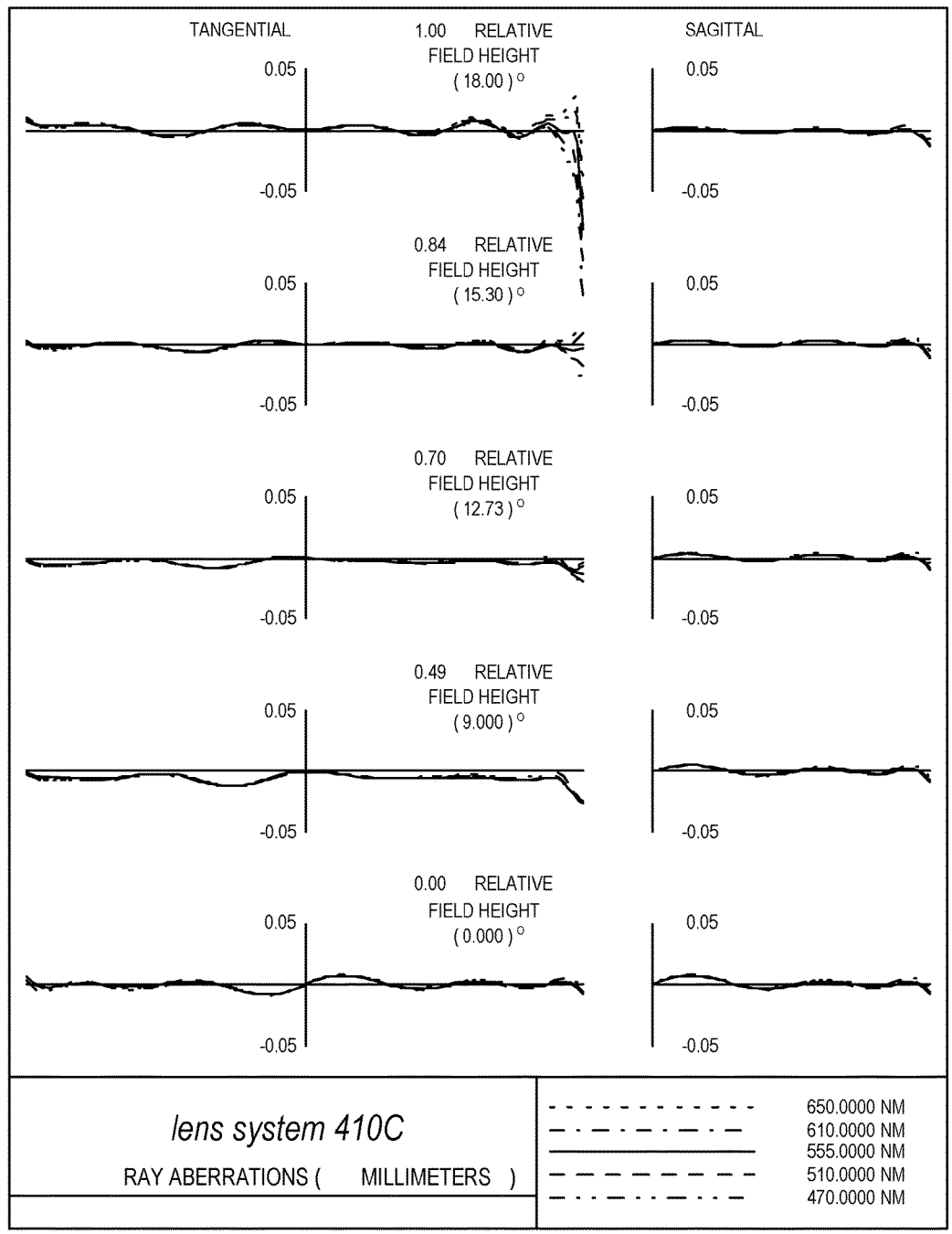

Referring to Tables 6A-6C, an embodiment of a compact telephoto lens system 410 with four lens elements as illustrated in FIG. 7 is described with 7-mm effective focal length f, f/2.5, 36 degrees FOV, 5.9 mm TTL, and telephoto ratio (TTL/f) of 0.842. The optical prescription in Tables 6A-6C describes an embodiment of lens system 410 in which positive lens element L1 is biconvex in shape, negative lens elements L2 and L3 both have a convex object side surface and are menisci in shape, and positive lens element L4 has a convex object side surface and is positive meniscus in shape. FIG. 10 illustrates a plot of the polychromatic ray aberrations curves over the half field of view HFOV covering 0-18 degrees, and over the visible spectral band ranging from 470 nm to 650 nm for a compact telephoto lens system 410 as illustrated in FIG. 7 and described in Tables 6A-6C.

The optical prescriptions in Tables 6A-6C describe an example embodiment of a compact telephoto lens system 410 as illustrated in FIG. 7 that includes four lens elements with refractive power and effective focal length f, in which the refractive power distribution of the lens elements L1, L2, L3, and L4 in terms of focal length are f1=2.932 mm, f2=−3.872 mm, f3=−4.250 mm, and f4=6.668 mm. Lens elements L1 and L2 are spaced closely such that the combination of L1 and L2 may be considered an air-spaced doublet lens of positive refractive power or positive focal length f12. Lens elements L3 and L4 are also spaced closely such that the combination of L3 and L4 may be considered a doublet lens having negative refractive power and negative focal length f34. In the example embodiment of lens system 410 as described by the optical prescription in Tables 6A-6C, f12=6.063 mm, f34=−10.744 mm, and the two air-spaced doublets are separated by an axial distance of T5=2.2096 mm. Lens element L1 is biconvex in shape with radii of curvature R2/R3=−0.258, and the negative meniscus lens element L2 has radii of curvature R4/R5=3.936. With such arrangement of radii of curvature, the combination of L1 and L2 is an air-spaced doublet of the Gaussian type. In the example embodiment of lens system 410 as described by the optical prescription in Tables 6A-6C, lens element L3 is negative meniscus in shape with radii of curvature R6/R7=5.750. Lens element L4 has vertex radii of curvature with R8/R9=0.470. The aspheric coefficients for the surfaces of the lens elements in this example embodiment of lens system 410 are listed in Table 6C. Configuring lens system 410 according to the arrangement of the power distribution of the lens elements, and adjusting the radii of curvature and aspheric coefficients as shown in Tables 5A-5C, the total track length (TTL) of the lens system 410 may be reduced (e.g., to 5.9 mm as shown in Table 6A) and aberration of the system may effectively be corrected to obtain optical performance of high image quality resolution in a small form factor telephoto camera 400.

FIG. 11 is a cross-sectional illustration of an example embodiment of a compact telephoto camera 500 including a compact telephoto lens system 510. Lens system 510 includes five lens elements (501-505) with refractive power. Lens system 510 may be viewed as a variation of lens systems 110 or 210 of FIGS. 1 and 3 or of lens system 310 of FIG. 5, and elements of the lens systems may be similar. However, in lens system 510, the aperture stop is located at the first lens element 501 and behind the front vertex of the lens system 510, rather than at or in front of the front vertex of the lens systems as illustrated in FIGS. 1, 3, and 5.

Tables 7A-7C provide example values for various optical and physical parameters of an example embodiment of a camera 500 and lens system 510 as illustrated in FIG. 11. Tables 7A-7C may be referred to as providing an optical prescription for the lens system 510. The optical prescription in Tables 7A-7C is for a lens system 510 with an effective focal length f of 7 mm at 555 nm wavelength, a focal ratio of f/2.8, with 36 degrees FOV, TTL of 6.0 mm, and with TTL/f equal to 0.857. Lens system 510 is a compact imaging lens system designed for the visible spectrum covering 470 nm to 650 nm.

The lens elements L1, L2, L3, L4, and L5 of lens system 510 may be composed of plastic materials with refractive indices and Abbe numbers as listed in Table 7B. Referring to lens system 510, the lens elements L1 and L4 may be composed of a plastic material having an Abbe number of V1=56.1. The lens elements L2, L3, and L5 may be composed of a plastic material with Abbe number V2=23.3.

Figure 12:
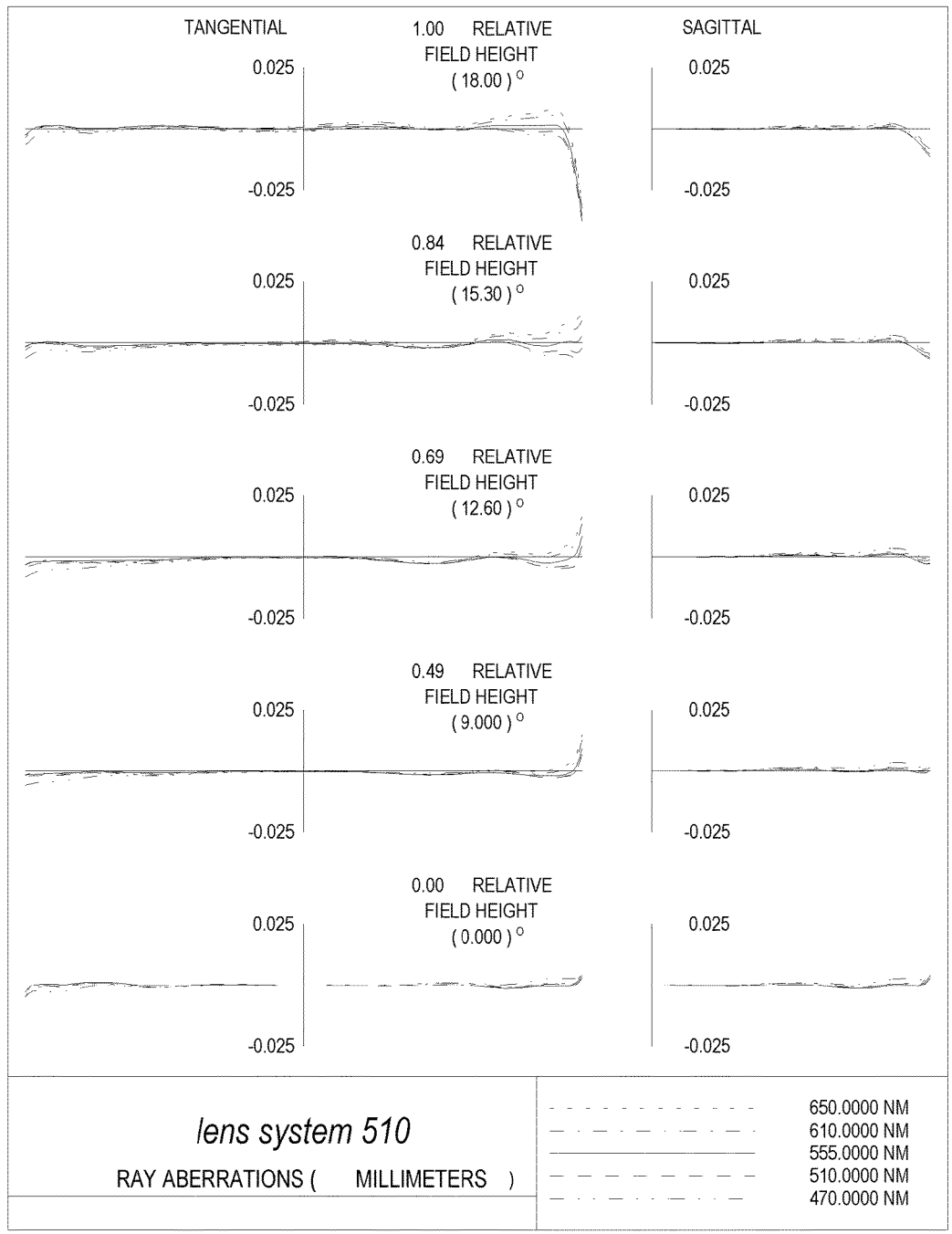
FIG. 12 illustrates a plot of the polychromatic ray aberration curves over the half field of view and over the visible spectral band ranging from 470 nm to 650 nm for a compact telephoto lens system as illustrated in FIG. 11.

Lens system 510 as specified in Tables 7A-7C is configured to correct optical aberrations as described in reference to lens system 110 and Tables 1A-1C. FIG. 12 illustrates a plot of the polychromatic ray aberration curves over the half field of view (HFOV=18 degrees), for an object field point on-axis (at 0 degree) to an off-axis field point at 18 degrees, and over the visible spectral band ranging from 470 nm to 650 nm for a compact telephoto lens system 510 as illustrated in FIG. 11 and described in Tables 7A-7C.

The aspheric coefficients for the surfaces of the lens elements in lens system 510 in the example embodiment are listed in Table 7C. Configuring lens system 510 according to the arrangement of the power distribution of the lens elements, and adjusting the radii of curvature and aspheric coefficients as shown in Tables 7A-7C, the total track length (TTL) of the lens system 510 may be reduced (e.g., to 6.0 mm as shown in Table 7A) and aberration of the system may effectively be corrected to obtain optical performance of high image quality resolution in a small form factor telephoto camera 500.

FIG. 13 is a cross-sectional illustration of an example embodiment of a compact telephoto camera 600 including a compact telephoto lens system 610. Lens system 610 includes five lens elements (601-605) with refractive power. Lens system 610 may be viewed as a variation of lens systems 110, 210, or 310 of FIGS. 1, 3, and 5, respectively, or of lens system 510 of FIG. 11, and elements of the lens systems may be similar. However, in lens system 610, the aperture stop is located between the first and second lens elements 601 and 602 of the lens system 610, rather than at or in front of the first lens element as illustrated in FIGS. 1, 3, 5, and 11.

Tables 8A-8C provide example values for various optical and physical parameters of an example embodiment of a camera 600 and lens system 610 as illustrated in FIG. 13. Tables 8A-8C may be referred to as providing an optical prescription for the lens system 610. The optical prescription in Tables 8A-8C is for a lens system 610 with an effective focal length f of 7 mm at 555 nm wavelength, a focal ratio of f/2.8, with 36 degrees FOV, TTL of 6.0 mm, and with TTL/f equal to 0.857. Lens system 610 is a compact imaging lens system designed for the visible spectrum covering 470 nm to 650 nm.

The lens elements L1, L2, L3, L4, and L5 of lens system 610 may be composed of plastic materials with refractive indices and Abbe numbers as listed in Table 8B. Referring to lens system 610, the lens elements L1 and L4 may be composed of a plastic material having an Abbe number of V1=56.1. The lens elements L2, L3, and L5 may be composed of a plastic material with Abbe number V2=23.3.

Figure 14:
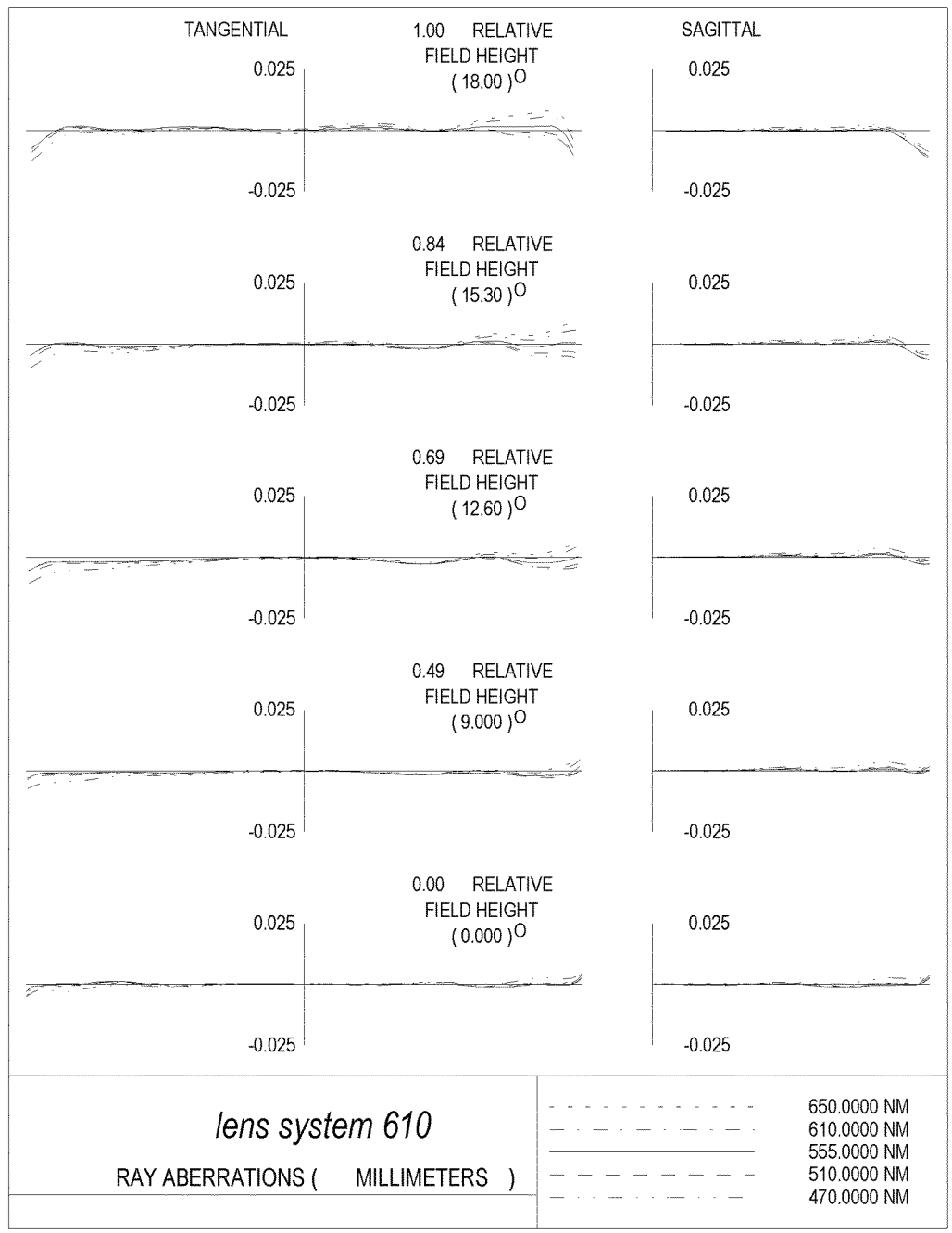
FIG. 14 illustrates a plot of the polychromatic ray aberration curves over the half field of view and over the visible spectral band ranging from 470 nm to 650 nm for a compact telephoto lens system as illustrated in FIG. 13.

Lens system 610 as specified in Tables 8A-8C is configured to correct optical aberrations as described in reference to lens system 110 and Tables 1A-1C. FIG. 14 illustrates a plot of the polychromatic ray aberration curves over the half field of view (HFOV=18 degrees), for an object field point on-axis (at 0 degree) to an off-axis field point at 18 degrees, and over the visible spectral band ranging from 470 nm to 650 nm for a compact telephoto lens system 610 as illustrated in FIG. 13 and described in Tables 8A-8C.

The aspheric coefficients for the surfaces of the lens elements in lens system 610 in the example embodiment are listed in Table 8C. Configuring lens system 610 according to the arrangement of the power distribution of the lens elements, and adjusting the radii of curvature and aspheric coefficients as shown in Tables 8A-8C, the total track length (TTL) of the lens system 610 may be reduced (e.g., to 6.0 mm as shown in Table 8A) and aberration of the system may effectively be corrected to obtain optical performance of high image quality resolution in a small form factor telephoto camera 600.

Figure 15:
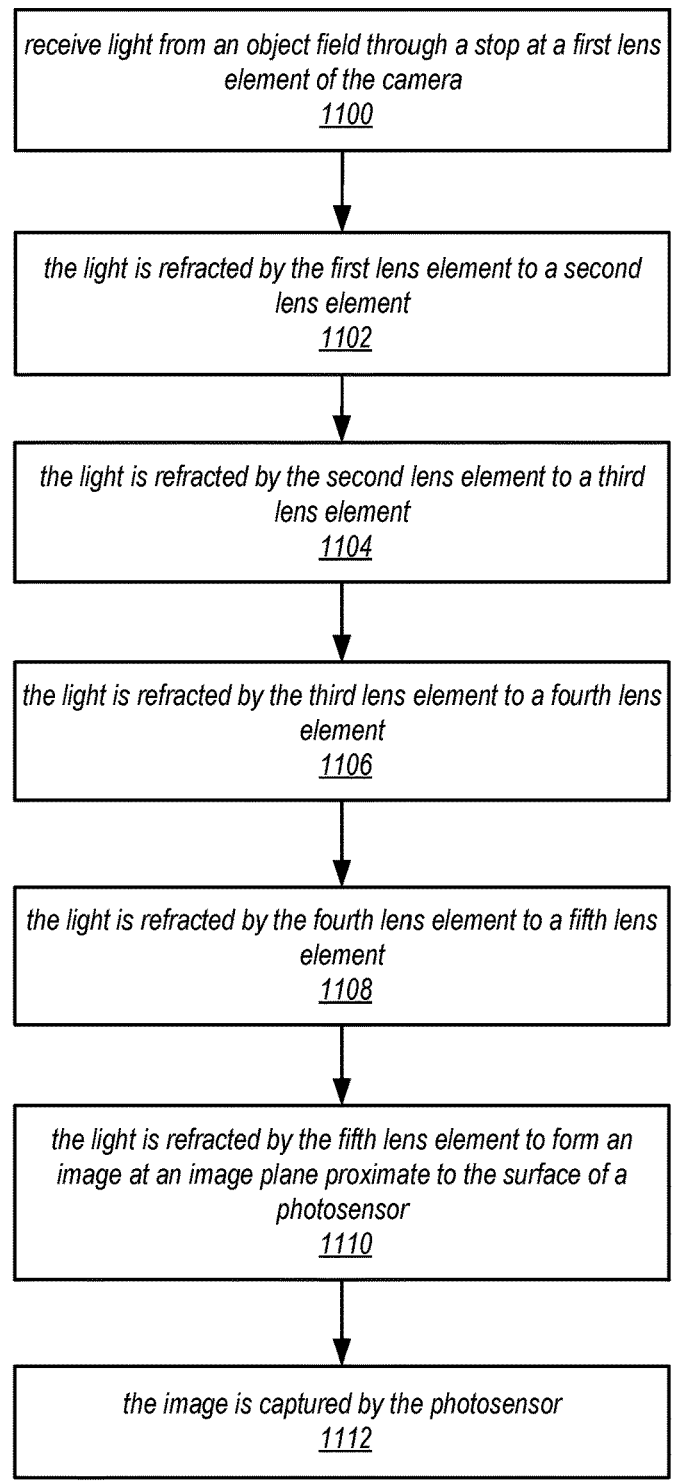
FIG. 15 is a high-level flowchart of a method for capturing images using a camera as illustrated in FIGS. 1, 3, 5, 11, and 13, according to at least some embodiments.

FIG. 15 is a high-level flowchart of a method for capturing images using a camera with a telephoto lens system that includes five lens elements as illustrated in FIGS. 1, 3, 5, 11, and 13, according to at least some embodiments. As indicated at 1100, light from an object field in front of the camera is received at a first lens element of the camera through an aperture stop. In some embodiments, the aperture stop may be located at the front vertex of the lens system, or between the front vertex and the object plane, as illustrated in FIGS. 1, 3, and 5. Alternatively, the aperture stop may be located behind the front vertex of the lens system as illustrated in FIGS. 11 and 13, for example at the first lens element as shown in FIG. 11, or between the first and second lens elements as shown in FIG. 13. As indicated at 1102, the first lens element refracts the light to a second lens element. As indicated at 1104, the light is then refracted by the second lens element to a third lens element. As indicated at 1106, the light is then refracted by the third lens element to a fourth lens element. As indicated at 1108, the light is then refracted by the fourth lens element to a fifth lens element. As indicated at 1110, the light is refracted by the fifth lens element to form an image at an image plane at or near the surface of a photosensor. As indicated at 1112, the image is captured by the photosensor. While not shown, in some embodiments, the light may pass through an infrared filter that may for example be located between the fifth lens element and the photosensor.

In some embodiments, the five lens elements may be configured as illustrated in FIG. 1 and according to the optical prescription provided in Tables 1A-1C. Alternatively, the five lens elements may be configured as illustrated in FIG. 3 and according to the optical prescription provided in Tables 2A-2C. As yet another alternative, the five lens elements may be configured as illustrated in FIG. 5 and according to the optical prescription provided in Tables 3A-3C. As yet another alternative, the five lens elements may be configured as illustrated in FIG. 11 and according to the optical prescription provided in Tables 7A-7C. As yet another alternative, the five lens elements may be configured as illustrated in FIG. 13 and according to the optical prescription provided in Tables 8A-8C. However, note that variations on the examples given in Tables 1A-1C, 2A-2C, 3A-3C, 7A-7C, and 8A-8C are possible while achieving similar optical results.

Figure 16:
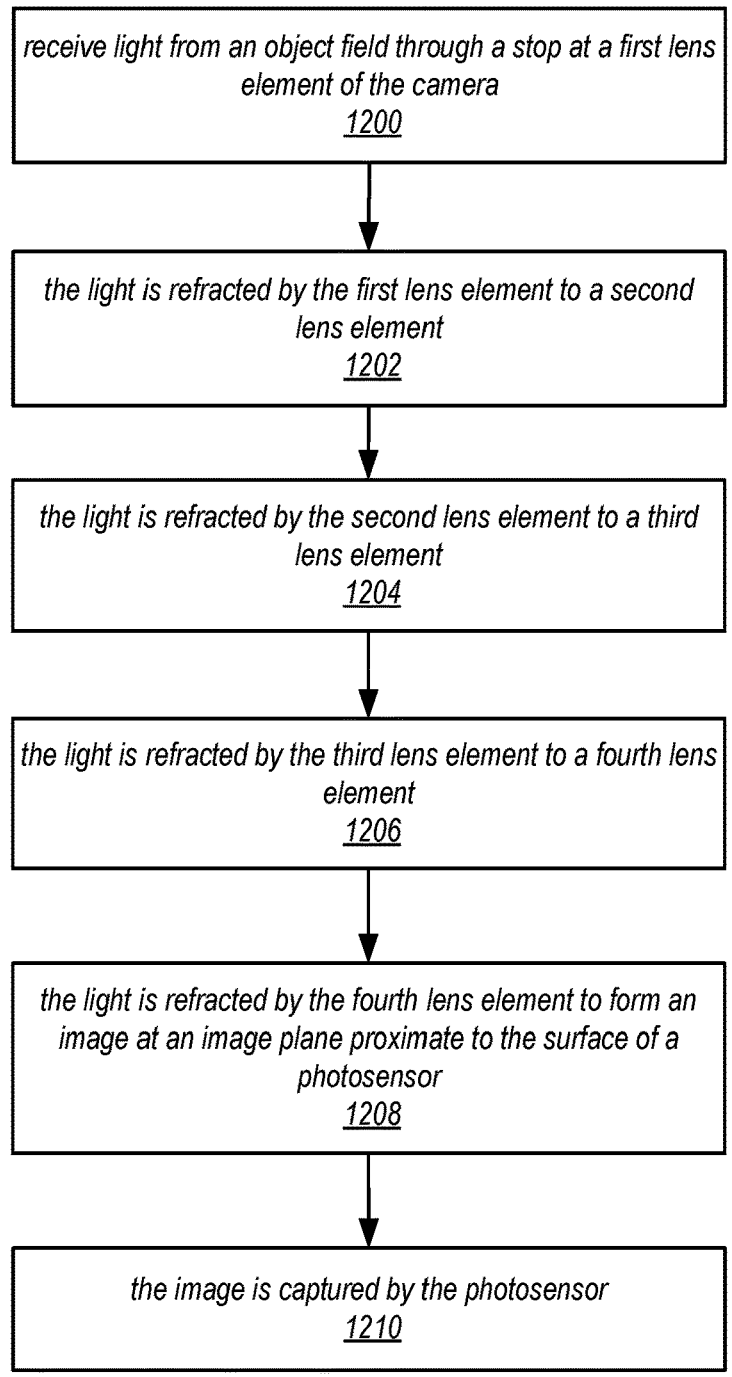
FIG. 16 is a flowchart of a method for capturing images using a camera as illustrated in FIG. 7, according to at least some embodiments.

FIG. 16 is a flowchart of a method for capturing images using a camera with a telephoto lens system that includes four lens elements as illustrated in FIG. 7, according to at least some embodiments. As indicated at 1200, light from an object field in front of the camera is received at a first lens element of the camera through an aperture stop. While FIG. 7 shows the aperture stop located at the front vertex of the lens system, in some embodiments location of the aperture stop may be closer to or farther away from the first lens element. Further, in some embodiments, the aperture stop may be located elsewhere in the telephoto lens system. As just one example, the aperture stop may be located between the first and second lens elements.

As indicated at 1202, the first lens element refracts the light to a second lens element. As indicated at 1204, the light is then refracted by the second lens element to a third lens element. As indicated at 1206, the light is then refracted by the third lens element to a fourth lens element. As indicated at 1208, the light is refracted by the fourth lens element to form an image at an image plane at or near the surface of a photosensor. As indicated at 1210, the image is captured by the photosensor. While not shown, in some embodiments, the light may pass through an infrared filter that may for example be located between the fourth lens element and the photosensor.

In some embodiments, the four lens elements may be configured as illustrated in FIG. 7 and according to the optical prescription provided in Tables 4A-4C. Alternatively, the four lens elements may be configured as illustrated in FIG. 7 and according to the optical prescription provided in Tables 5A-5C. As yet another alternative, the four lens elements may be configured as illustrated in FIG. 7 and according to the optical prescription provided in Tables 6A-6C. However, note that variations on the examples given in Tables 4A-4C, 5A-5C, and 6A-6C are possible while achieving similar optical results.

Example Lens System Tables

The following Tables provide example values for various optical and physical parameters of example embodiments of the telephoto lens systems and cameras as described herein in reference to FIGS. 1 through 14. Tables 1A-1C correspond to an example embodiment of a lens system 110 with five lens elements as illustrated in FIG. 1. Tables 2A-2C correspond to an example embodiment of a lens system 210 with five lens elements as illustrated in FIG. 3. Tables 3A-3C correspond to an example embodiment of a lens system 310 with five lens elements as illustrated in FIG. 5. Tables 4A-4C, 5A-5C, and 6A-6C correspond to three different example embodiments of a lens system 410 with four lens elements as illustrated in FIG. 7. Tables 7A-7C correspond to an example embodiment of a lens system 510 with five lens elements as illustrated in FIG. 11. Tables 8A-8C correspond to an example embodiment of a lens system 510 with five lens elements as illustrated in FIG. 13.

In the Tables, all dimensions are in millimeters unless otherwise specified. "S#" stands for surface number. A positive radius indicates that the center of curvature is to the right of the surface. A negative radius indicates that the center of curvature is to the left of the surface. "INF" stands for infinity (as used in optics). "ASP" indicates an aspheric surface, and "FLAT" indicates a flat surface. The thickness (or separation) is the axial distance to the next surface. The design wavelengths represent wavelengths in the spectral band of the imaging optical system.

For the materials of the lens elements and IR filter, a refractive index $N_d$ at the helium d-line wavelength is provided, as well as an Abbe number $V_d$ relative to the d-line and the C- and F-lines of hydrogen. The Abbe number, $V_d$, may be defined by the equation:

$$V_d = (N_d - 1)/(N_F - N_C),$$

where $N_F$ and $N_C$ are the refractive index values of the material at the F and C lines of hydrogen, respectively.

Referring to the Tables of aspheric constants (Tables, 1C, 2C, 3C, 4C, 5C, 6C, 7C, and 8C), the aspheric equation describing an aspherical surface may be given by:

$$Z = \frac{cr^2}{1 + \sqrt{1 - (1+K)c^2 r^2}} + Ar^4 + Br^6 + Cr^8 + Dr^{10} + Er^{12} + Fr^{14} + Gr^{16} + Hr^{18} + \ldots$$

where Z is the sag of surface parallel to the z-axis (the z-axis and the optical axis (AX) are coincident in these example embodiments), r is the radial distance from the vertex, c is the curvature of the surface at the vertex (the reciprocal of the radius of curvature of the surface), K is the conic constant, and A, B, C, D, E, F, G, and H are the aspheric coefficients. In the Tables, "E" denotes the exponential notation (powers of 10).

Note that the values given in the following Tables for the various parameters in the various embodiments of the telephoto lens system are given by way of example and are not intended to be limiting. For example, one or more of the parameters for one or more of the surfaces of one or more of the lens elements in the example embodiments, as well as parameters for the materials of which the elements are composed, may be given different values while still providing similar performance for the lens system. In particular, note that some values in the Tables may be scaled up or down for larger or smaller implementations of a camera using an embodiment of a telephoto lens system as described herein.

Further note that surface numbers (S#) of the elements in the various embodiments of the telephoto lens system as shown in the Tables are listed from a first surface 0 at the object plane to a last surface at the image plane. Since number and location of elements may vary in embodiments, the surface number(s) that correspond to some elements may vary in the different Tables. For example, in the first six sets of Tables, the aperture stop is surface 1, and the first lens element (L1) has surfaces 2 and 3. However, in Tables 7A-7C and 8A-8C, the location of the aperture stop is different, and thus the surface numbers are different in the Tables. For example, in Tables 7B and 7C, the first lens element (L1) has surfaces 4 and 5, and in Tables 8A and 8B the first lens element (L1) has surfaces 1 and 2 (while the aperture stop is surface 3). In particular, note that where reference is given to the radius of curvature (R#) of the surfaces of the lens elements (L#) in this document, the reference (R#) used (e.g., R2 and R3 for the surfaces of lens element L1) are the same for all of the example embodiments, and may but do not necessarily correspond to the surface numbers of the lens elements as given in the Tables.

TABLE 1A

| | |
|---|---|
| Focal length (f) | 7.0 mm |
| F-Number | 2.8 |
| Half FOV | 18° |
| Total track length (TTL) | 5.7 mm |
| Telephoto ratio (TTL/f) | 0.814 |
| Design wavelengths | 650 nm, 610 nm, 555 nm, 510 nm, 470 nm |

TABLE 1B

| Element | Surface (S#) | Radius R | Shape | Thickness or Separation | Material | Refractive Index $N_d$ | Abbe Number $V_d$ |
|---|---|---|---|---|---|---|---|
| Object plane | 0 | INF | FLAT | INF | | | |
| Aperture stop | 1 | INF | FLAT | 0.0 | | | |
| L1 | 2 | 1.673 | ASP | 1.1684 | Plastic | 1.544 | 56.1 |
| | 3 | −9.726 | ASP | 0.1000 | | | |
| L2 | 4 | 11.643 | ASP | 0.2300 | Plastic | 1.632 | 23.3 |
| | 5 | 2.017 | ASP | 0.7077 | | | |
| L3 | 6 | −213.666 | ASP | 0.2300 | Plastic | 1.632 | 23.3 |
| | 7 | 14.671 | ASP | 1.3137 | | | |

TABLE 1B-continued

| Element | Surface (S#) | Radius R | Shape | Thickness or Separation | Material | Refractive Index $N_d$ | Abbe Number $V_d$ |
|---|---|---|---|---|---|---|---|
| L4 | 8 | −4.521 | ASP | 0.2300 | Plastic | 1.544 | 56.1 |
|  | 9 | 2.864 | ASP | 0.1000 |  |  |  |
| L5 | 10 | 4.893 | ASP | 0.7763 | Plastic | 1.632 | 23.3 |
|  | 11 | −8.103 | ASP | 0.3039 |  |  |  |
| IR filter | 12 | INF | FLAT | 0.2300 | Glass | 1.516 | 64.1 |
|  | 13 | INF | FLAT | 0.3099 |  |  |  |
| Image plane | 14 | INF | FLAT |  |  |  |  |

TABLE 1C

ASPHERIC CONSTANTS

| S# | Curvature (c) | K | A<br>E | B<br>F | C<br>G | D<br>H |
|---|---|---|---|---|---|---|
| 2 | 0.59785079 | −0.19216064 | 1.61976E−02<br>−3.00338E−03 | −2.16719E−02<br>0.00000E+00 | 1.43453E−02<br>0.00000E+00 | 8.88075E−04<br>0.00000E+00 |
| 3 | −0.10282157 | 0.00000000 | 3.33438E−02<br>−2.74116E−03 | −1.89863E−02<br>−2.31821E−04 | −2.81318E−02<br>0.00000E+00 | 1.75534E−02<br>0.00000E+00 |
| 4 | 0.08589051 | 0.00000000 | −4.31287E−02<br>6.40409E−03 | 2.99609E−02<br>0.00000E+00 | 1.71198E−02<br>0.00000E+00 | −9.94839E−03<br>0.00000E+00 |
| 5 | 0.49577936 | −25.0000000 | 1.97722E−01<br>1.00492E−01 | −2.33942E−01<br>0.00000E+00 | 3.37138E−01<br>0.00000E+00 | −1.85937E−01<br>0.00000E+00 |
| 6 | −0.468020E−02 | 0.00000000 | 6.09888E−02<br>0.00000E+00 | −2.76429E−02<br>0.00000E+00 | 1.05749E−01<br>0.00000E+00 | −4.61969E−02<br>0.00000E+00 |
| 7 | 0.06816110 | 0.00000000 | 1.02750E−01<br>−3.06636E−02 | 1.70897E−02<br>0.00000E+00 | 1.88497E−02<br>0.00000E+00 | 3.44798E−02<br>0.00000E+00 |
| 8 | −0.22118912 | −2.16463818 | −7.34172E−03<br>−9.26309E−04 | 3.07556E−03<br>0.00000E+00 | 5.70157E−03<br>0.00000E+00 | 2.85100E−04<br>0.00000E+00 |
| 9 | 0.34921854 | 0.00000000 | −7.41657E−02<br>−6.96384E−05 | 1.37581E−02<br>0.00000E+00 | −3.86267E−03<br>0.00000E+00 | 3.22109E−04<br>0.00000E+00 |
| 10 | 0.20438810 | 0.00000000 | −1.68054E−02<br>0.00000E+00 | 2.75927E−03<br>0.00000E+00 | −1.69414E−04<br>0.00000E+00 | 9.69418E−05<br>0.00000E+00 |
| 11 | −0.12341260 | 0.00000000 | −3.33203E−02<br>0.00000E+00 | 5.74025E−03<br>0.00000E+00 | 1.31067E−03<br>0.00000E+00 | −1.14529E−04<br>0.00000E+00 |

TABLE 2A

| | |
|---|---|
| Focal length (f) | 7.0 mm |
| F-Number | 2.8 |
| Half FOV | 18° |
| Total track length (TTL) | 5.7 mm |
| Telephoto ratio (TTL/f) | 0.814 |
| Design wavelengths | 650 nm, 610 nm, 555 nm, 510 nm, 470 nm |

TABLE 2B

| Element | Surface (S#) | Radius R | Shape | Thickness or Separation | Material | Refractive Index $N_d$ | Abbe Number $V_d$ |
|---|---|---|---|---|---|---|---|
| Object plane | 0 | INF | FLAT | INF |  |  |  |
| Aperture stop | 1 | INF | FLAT | 0.0 |  |  |  |
| L1 | 2 | 1.679 | ASP | 1.1080 | Plastic | 1.544 | 56.1 |
|  | 3 | −9.162 | ASP | 0.1000 |  |  |  |
| L2 | 4 | −15.649 | ASP | 0.2300 | Plastic | 1.632 | 23.3 |
|  | 5 | 3.482 | ASP | 1.1305 |  |  |  |
| L3 | 6 | −12.801 | ASP | 0.2300 | Plastic | 1.632 | 23.3 |
|  | 7 | 21.119 | ASP | 1.0559 |  |  |  |
| L4 | 8 | −3.266 | ASP | 0.2300 | Plastic | 1.544 | 56.1 |
|  | 9 | 2.724 | ASP | 0.1000 |  |  |  |
| L5 | 10 | 5.272 | ASP | 1.0356 | Plastic | 1.632 | 23.3 |
|  | 11 | −4.681 | ASP | 0.1337 |  |  |  |
| IR filter | 12 | INF | FLAT | 0.2100 | Glass | 1.516 | 64.1 |
|  | 13 | INF | FLAT | 0.1363 |  |  |  |
| Image plane | 14 | INF | FLAT |  |  |  |  |

TABLE 2C

ASPHERIC CONSTANTS

| S# | Curvature (c) | K | A<br>E | B<br>F | C<br>G | D<br>H |
|---|---|---|---|---|---|---|
| 2 | 0.59554801 | 0.22669364 | 9.80281E−03<br>−2.75496E−03 | −3.81227E−02<br>−2.69638E−04 | 2.39681E−02<br>0.00000E+00 | −6.29128E−03<br>0.00000E+00 |
| 3 | −0.10914948 | 0.00000000 | 3.73187E−02<br>−1.26858E−02 | −8.91760E−03<br>1.16125E−03 | −5.89384E−02<br>0.00000E+00 | 4.41115E−02<br>0.00000E+00 |
| 4 | −0.06390120 | 0.00000000 | 6.93172E−02<br>2.22119E−02 | −4.31157E−02<br>−4.84076E−03 | 2.33346E−02<br>0.00000E+00 | −2.33074E−02<br>0.00000E+00 |
| 5 | 0.28715632 | 8.70133393 | 5.21579E−03<br>3.32216E−02 | 7.15829E−02<br>0.00000E+00 | −4.60926E−02<br>0.00000E+00 | 1.24310E−02<br>0.00000E+00 |
| 6 | −0.07812160 | 0.00000000 | 3.96000E−02<br>0.00000E+00 | −3.42179E−02<br>0.00000E+00 | 7.75523E−02<br>0.00000E+00 | −4.22361E−02<br>0.00000E+00 |
| 7 | 0.04735179 | 0.00000000 | 1.01117E−01<br>−6.52751E−03 | −3.21118E−02<br>0.00000E+00 | 9.03668E−02<br>0.00000E+00 | −3.37156E−02<br>0.00000E+00 |
| 8 | −0.30620054 | 0.85965815 | −4.91398E−02<br>−9.54019E−04 | −5.57533E−03<br>−2.40349E−06 | 1.31557E−02<br>0.00000E+00 | 1.22280E−03<br>0.00000E+00 |
| 9 | 0.36712935 | 0.00000000 | −8.88955E−02<br>−2.24134E−04 | 2.87927E−02<br>0.00000E+00 | −8.83436E−03<br>0.00000E+00 | 1.57329E−03<br>0.00000E+00 |
| 10 | 0.18967188 | 0.00000000 | −2.38313E−02<br>0.00000E+00 | 5.50321E−03<br>0.00000E+00 | −9.19080E−04<br>0.00000E+00 | −9.80631E−05<br>0.00000E+00 |
| 11 | −0.21364516 | 3.15790955 | −3.17139E−02<br>0.00000E+00 | 3.80781E−03<br>0.00000E+00 | 3.43810E−04<br>0.00000E+00 | −3.27888E−05<br>0.00000E+00 |

TABLE 3A

| | |
|---|---|
| Focal length (f) | 7.0 mm |
| F-Number | 2.8 |
| Half FOV | 18° |
| Total track length (TTL) | 5.6 mm |
| Telephoto ratio (TTL/f) | 0.80 |
| Design wavelengths | 650 nm, 610 nm, 555 nm, 510 nm, 470 nm |

TABLE 3B

| Element | Surface (S#) | Radius R | Shape | Thickness or Separation | Material | Refractive Index $N_d$ | Abbe Number $V_d$ |
|---|---|---|---|---|---|---|---|
| Object plane | 0 | INF | FLAT | INF | | | |
| Aperture stop | 1 | INF | FLAT | 0.0 | | | |
| L1 | 2 | 1.753 | ASP | 1.0982 | Plastic | 1.544 | 56.1 |
| | 3 | −8.514 | ASP | 0.1000 | | | |
| L2 | 4 | 4.680 | ASP | 0.2300 | Plastic | 1.632 | 23.3 |
| | 5 | 1.485 | ASP | 0.4931 | | | |
| L3 | 6 | 13.930 | ASP | 0.2300 | Plastic | 1.632 | 23.3 |
| | 7 | 18.844 | ASP | 1.6356 | | | |
| L4 | 8 | −6.782 | ASP | 0.2300 | Plastic | 1.544 | 56.1 |
| | 9 | 2.444 | ASP | 0.1022 | | | |
| L5 | 10 | 4.187 | ASP | 0.6076 | Plastic | 1.632 | 23.3 |
| | 11 | −28.195 | ASP | 0.3128 | | | |
| IR filter | 12 | INF | FLAT | 0.2300 | Glass | 1.516 | 64.1 |
| | 13 | INF | FLAT | 0.3305 | | | |
| Image plane | 14 | INF | FLAT | | | | |

TABLE 3C

ASPHERIC CONSTANTS

| S# | Curvature (c) | K | A<br>E | B<br>F | C<br>G | D<br>H |
|---|---|---|---|---|---|---|
| 2 | 0.57056992 | −0.22528756 | 1.55892E−02<br>−2.19158E−03 | −2.22235E−02<br>0.00000E+00 | 1.79035E−02<br>0.00000E+00 | −4.66476E−03<br>0.00000E+00 |
| 3 | −0.11744864 | 0.00000000 | 3.83035E−02<br>−3.16638E−03 | −2.70838E−02<br>−1.95794E−04 | −2.45562E−02<br>0.00000E+00 | 1.76178E−02<br>0.00000E+00 |
| 4 | 0.21369557 | 0.00000000 | −1.22882E−01<br>2.46121E−03 | 5.09701E−02<br>0.00000E+00 | 7.09580E−04<br>0.00000E+00 | −3.25926E−03<br>0.00000E+00 |

TABLE 3C-continued

ASPHERIC CONSTANTS

| S# | Curvature (c) | K | A<br>E | B<br>F | C<br>G | D<br>H |
|---|---|---|---|---|---|---|
| 5 | 0.67325190 | −15.89218045 | 2.22697E−01<br>−3.50614E−03 | −3.89684E−01<br>−3.50614E−03 | 4.24593E−01<br>0.00000E+00 | −1.05738E−01<br>0.00000E+00 |
| 6 | 0.07178570 | 0.00000000 | 1.16266E−01<br>0.00000E+00 | −6.77454E−02<br>0.00000E+00 | 1.28407E−01<br>0.00000E+00 | −4.67691E−02<br>0.00000E+00 |
| 7 | 0.05306826 | 0.00000000 | 1.29004E−01<br>−2.93397E−02 | 3.48321E−02<br>0.00000E+00 | −3.15339E−02<br>0.00000E+00 | 6.44071E−02<br>0.00000E+00 |
| 8 | −0.14745721 | 21.59367712 | −9.87056E−02<br>−4.75908E−03 | 5.58192E−03<br>−3.45779E−04 | 5.07171E−04<br>0.00000E+00 | 6.68101E−03<br>0.00000E+00 |
| 9 | 0.40922164 | 0.00000000 | −1.05904E−01<br>1.31582E−04 | 1.45986E−02<br>0.00000E+00 | −1.66551E−03<br>0.00000E+00 | −1.34325E−03<br>0.00000E+00 |
| 10 | 0.23881840 | 0.00000000 | −3.24170E−02<br>−3.32353E−06 | 7.53655E−03<br>0.00000E+00 | 9.20005E−04<br>0.00000E+00 | −1.50434E−04<br>0.00000E+00 |
| 11 | −0.03546731 | 0.00000000 | −4.65887E−02<br>−2.88832E−06 | 1.18976E−02<br>0.00000E+00 | 3.37895E−03<br>0.00000E+00 | −6.21374E−04<br>0.00000E+00 |

TABLE 4A

| | |
|---|---|
| Focal length (f) | 7.0 mm |
| F-Number | 2.8 |
| Half FOV | 18° |
| Total track length (TTL) | 5.7 mm |
| Telephoto ratio (TTL/f) | 0.814 |
| Design wavelengths | 650 nm, 610 nm, 555 nm, 510 nm, 470 nm |

TABLE 4B

| Element | Surface (S#) | Radius R | Shape | Thickness or Separation | Material | Refractive Index $N_d$ | Abbe Number $V_d$ |
|---|---|---|---|---|---|---|---|
| Object plane | 0 | INF | FLAT | INF | | | |
| Aperture stop | 1 | INF | FLAT | 0.0 | | | |
| L1 | 2 | 1.840 | ASP | 1.0077 | Plastic | 1.544 | 56.1 |
| | 3 | −9.400 | ASP | 0.0500 | | | |
| L2 | 4 | 4.424 | ASP | 0.2300 | Plastic | 1.632 | 23.3 |
| | 5 | 1.623 | ASP | 2.3327 | | | |
| L3 | 6 | −703.898 | ASP | 0.2300 | Plastic | 1.544 | 56.1 |
| | 7 | 2.241 | ASP | 0.1400 | | | |
| L4 | 8 | 2.616 | ASP | 0.5932 | Plastic | 1.632 | 23.3 |
| | 9 | 5.456 | ASP | 0.1000 | | | |
| IR filter | 10 | INF | FLAT | 0.2300 | Glass | 1.516 | 64.1 |
| | 11 | INF | FLAT | 0.7864 | | | |
| Image plane | 12 | INF | FLAT | | | | |

TABLE 4C

ASPHERIC CONSTANTS

| S# | Curvature (c) | K | A<br>E | B<br>F | C<br>G | D<br>H |
|---|---|---|---|---|---|---|
| 2 | 0.54359594 | 0.30403777 | 1.07464E−02<br>1.71611E−03 | −3.61839E−02<br>0.00000E+00 | 3.17224E−02<br>0.00000E+00 | −1.52447E−02<br>0.00000E+00 |
| 3 | −0.10638305 | 0.00000000 | 1.04200E−02<br>−4.05255E−03 | −3.67175E−03<br>1.04543E−03 | −8.29009E−03<br>0.00000E+00 | 7.47494E−03<br>0.00000E+00 |
| 4 | 0.22603041 | 0.00000000 | −1.20608E−01<br>−4.31776E−04 | 9.40721E−02<br>0.00000E+00 | −4.98486E−02<br>0.00000E+00 | 1.63431E−02<br>0.00000E+00 |
| 5 | 0.61621243 | −19.99986045 | 2.54494E−01<br>−2.41997E−02 | −3.83521E−01<br>2.78930E−02 | 3.88992E−01<br>0.00000E+00 | −1.43164E−01<br>0.00000E+00 |
| 6 | −0.142066E−02 | 0.00000000 | −1.51091E−01<br>3.37968E−03 | −3.27080E−03<br>−4.38034E−05 | 1.16418E−02<br>0.00000E+00 | −1.05737E−02<br>0.00000E+00 |
| 7 | 0.44615066 | 0.00000000 | −1.42513E−01<br>5.49855E−05 | 2.41934E−02<br>0.00000E+00 | −2.23618E−03<br>0.00000E+00 | 2.26565E−04<br>0.00000E+00 |
| 8 | 0.3823203 | 0.00000000 | −6.70140E−02<br>0.00000E+00 | 1.58234E−02<br>0.00000E+00 | −2.93990E−03<br>0.00000E+00 | 2.26565E−04<br>0.00000E+00 |

TABLE 4C-continued

ASPHERIC CONSTANTS

| S# | Curvature (c) | K | A<br>E | B<br>F | C<br>G | D<br>H |
|---|---|---|---|---|---|---|
| 9 | 0.18327855 | 0.00000000 | −7.53143E−02<br>0.00000E+00 | 2.30066E−02<br>0.00000E+00 | −4.31351E−03<br>0.00000E+00 | 3.00055E−04<br>0.00000E+00 |

TABLE 5A

| | |
|---|---|
| Focal length (f) | 7.0 mm |
| F-Number | 2.8 |
| Half FOV | 18° |
| Total track length (TTL) | 5.85 mm |
| Telephoto ratio (TTL/f) | 0.836 |
| Design wavelengths | 650 nm, 610 nm, 555 nm, 510 nm, 470 nm |

TABLE 6A

| | |
|---|---|
| Focal length (f) | 7.0 mm |
| F-Number | 2.5 |
| Half FOV | 18° |
| Total track length (TTL) | 5.9 mm |
| Telephoto ratio (TTL/f) | 0.842 |
| Design wavelengths | 650 nm, 610 nm, 555 nm, 510 nm, 470 nm |

TABLE 5B

| Element | Surface (S#) | Radius R | Shape | Thickness or Separation | Material | Refractive Index $N_d$ | Abbe Number $V_d$ |
|---|---|---|---|---|---|---|---|
| Object plane | 0 | INF | FLAT | INF | | | |
| Aperture stop | 1 | INF | FLAT | 0.0 | | | |
| L1 | 2 | 1.883 | ASP | 1.2034 | Plastic | 1.544 | 56.1 |
| | 3 | −8.352 | ASP | 0.0500 | | | |
| L2 | 4 | 7.016 | ASP | 0.2300 | Plastic | 1.632 | 23.3 |
| | 5 | 1.855 | ASP | 2.2376 | | | |
| L3 | 6 | 32.654 | ASP | 0.2300 | Plastic | 1.544 | 56.1 |
| | 7 | 2.090 | ASP | 0.1302 | | | |
| L4 | 8 | 2.520 | ASP | 0.6123 | Plastic | 1.632 | 23.3 |
| | 9 | 5.452 | ASP | 0.2220 | | | |
| IR filter | 10 | INF | FLAT | 0.2300 | Glass | 1.516 | 64.1 |
| | 11 | INF | FLAT | 0.7046 | | | |
| Image plane | 12 | INF | FLAT | | | | |

TABLE 5C

ASPHERIC CONSTANTS

| S# | Curvature (c) | K | A<br>E | B<br>F | C<br>G | D<br>H |
|---|---|---|---|---|---|---|
| 2 | 0.53117357 | 0.10076738 | 1.25802E−02<br>1.34365E−03 | −2.72609E−02<br>0.00000E+00 | 2.34732E−02<br>0.00000E+00 | −1.01134E−02<br>0.00000E+00 |
| 3 | −0.11972891 | 0.00000000 | 1.47086E−02<br>−1.93094E−03 | −4.24121E−03<br>4.11413E−04 | −6.59940E−03<br>0.00000E+00 | 5.26728E−03<br>0.00000E+00 |
| 4 | 0.14253186 | 0.00000000 | −9.51041E−02<br>−1.19814E−03 | 7.47540E−02<br>0.00000E+00 | −4.03277E−02<br>0.00000E+00 | 1.40799E−02<br>0.00000E+00 |
| 5 | 0.53902729 | −24.72392792 | 2.18622E−01<br>−4.27313E−03 | −3.17371E−01<br>1.75696E−02 | 3.26704E−01<br>0.00000E+00 | −1.34030E−01<br>0.00000E+00 |
| 6 | 0.03062376 | 0.00000000 | −1.47113E−01<br>4.34759E−03 | −9.39484E−04<br>−3.18692E−04 | 1.10834E−02<br>0.00000E+00 | −1.07303E−02<br>0.00000E+00 |
| 7 | 0.47851018 | 0.00000000 | −1.49733E−01<br>7.10178E−05 | 2.63283E−02<br>0.00000E+00 | −3.05293E−03<br>0.00000E+00 | 6.55204E−05<br>0.00000E+00 |
| 8 | 0.39678929 | 0.00000000 | −6.99540E−02<br>−1.65133E−05 | 1.74616E−02<br>0.00000E+00 | −2.92734E−03<br>0.00000E+00 | 2.22020E−04<br>0.00000E+00 |
| 9 | 0.18343360 | 0.00000000 | −7.29559E−02<br>−3.41181E−05 | 2.27801E−02<br>0.00000E+00 | −3.92842E−03<br>0.00000E+00 | 3.74033E−04<br>0.00000E+00 |

TABLE 6B

| Element | Surface (S#) | Radius R | Shape | Thickness or Separation | Material | Refractive Index $N_d$ | Abbe Number $V_d$ |
|---|---|---|---|---|---|---|---|
| Object plane | 0 | INF | FLAT | INF | | | |
| Aperture stop | 1 | INF | FLAT | 0.0 | | | |
| L1 | 2 | 1.916 | ASP | 1.2789 | Plastic | 1.544 | 56.1 |
|  | 3 | −7.423 | ASP | 0.0500 | | | |
| L2 | 4 | 7.127 | ASP | 0.2300 | Plastic | 1.632 | 23.3 |
|  | 5 | 1.811 | ASP | 2.2096 | | | |
| L3 | 6 | 10.920 | ASP | 0.2300 | Plastic | 1.544 | 56.1 |
|  | 7 | 1.899 | ASP | 0.1194 | | | |
| L4 | 8 | 2.448 | ASP | 0.6171 | Plastic | 1.632 | 23.3 |
|  | 9 | 5.206 | ASP | 0.2200 | | | |
| IR filter | 10 | INF | FLAT | 0.2300 | Glass | 1.516 | 64.1 |
|  | 11 | INF | FLAT | 0.7151 | | | |
| Image plane | 12 | INF | FLAT | | | | |

TABLE 6C

ASPHERIC CONSTANTS

| S# | Curvature (c) | K | A / E | B / F | C / G | D / H |
|---|---|---|---|---|---|---|
| 2 | 0.52183529 | −0.07720366 | 1.46341E−02 | −2.48395E−02 | 2.22385E−02 | −9.20416E−03 |
|  |  |  | 1.21715E−03 | 0.00000E+00 | 0.00000E+00 | 0.00000E+00 |
| 3 | −0.13472522 | 0.00000000 | 2.99796E−02 | −1.36208E−02 | −6.71745E−03 | 4.33779E−03 |
|  |  |  | −1.92789E−04 | −8.79693E−05 | 0.00000E+00 | 0.00000E+00 |
| 4 | 0.14030600 | 0.00000000 | −8.02143E−02 | 6.85447E−02 | −5.83252E−02 | 2.89038E−02 |
|  |  |  | −4.51377E−03 | 0.00000E+00 | 0.00000E+00 | 0.00000E+00 |
| 5 | 0.55228456 | −24.72392792 | 2.36560E−01 | −3.47355E−01 | 3.35652E−01 | −1.28634E−01 |
|  |  |  | −7.69847E−03 | 1.75677E−02 | 0.00000E+00 | 0.00000E+00 |
| 6 | 0.09157796 | 0.00000000 | −1.34024E−01 | −1.89494E−02 | 3.00211E−02 | −1.88323E−02 |
|  |  |  | 2.85063E−03 | 9.90165E−04 | 0.00000E+00 | 0.00000E+00 |
| 7 | 0.52651322 | 0.00000000 | −1.57518E−01 | 2.76149E−02 | −3.16376E−03 | −1.31706E−03 |
|  |  |  | 3.92416E−04 | 0.00000E+00 | 0.00000E+00 | 0.00000E+00 |
| 8 | 0.40842256 | 0.00000000 | −7.89333E−02 | 2.06852E−02 | −3.71946E−03 | 3.25167E−04 |
|  |  |  | −2.96550E−05 | 0.00000E+00 | 0.00000E+00 | 0.00000E+00 |
| 9 | 0.19207877 | 0.00000000 | −7.32189E−02 | 1.70840E−02 | −1.28939E−03 | 5.83216E−05 |
|  |  |  | −4.62557E−05 | 0.00000E+00 | 0.00000E+00 | 0.00000E+00 |

TABLE 7A

| | |
|---|---|
| Focal length (f) | 7.0 mm |
| F-Number | 2.8 |
| Half FOV | 18° |
| Total track length (TTL) | 6.0 mm |
| Telephoto ratio (TTL/f) | 0.857 |
| Design wavelengths | 650 nm, 610 nm, 555 nm, 510 nm, 470 nm |

TABLE 7B

| Element | Surface (S#) | Radius R | Shape | Thickness or Separation | Material | Refractive Index $N_d$ | Abbe Number $V_d$ |
|---|---|---|---|---|---|---|---|
| Object plane | 0 | INF | FLAT | INF | | | |
|  | 1 | INF | FLAT | 0.6 | | | |
| Aperture stop | 2 | INF | FLAT | −0.6 | | | |
|  | 3 | INF | FLAT | 0.0 | | | |
| L1 | 4 | 1.581 | ASP | 0.8579 | Plastic | 1.544 | 56.1 |
|  | 5 | −19.799 | ASP | 0.2310 | | | |
| L2 | 6 | 15.295 | ASP | 0.2300 | Plastic | 1.632 | 23.3 |
|  | 7 | 2.255 | ASP | 0.5716 | | | |
| L3 | 8 | −9.153 | ASP | 0.2300 | Plastic | 1.632 | 23.3 |
|  | 9 | −101.250 | ASP | 1.7007 | | | |
| L4 | 10 | −2.968 | ASP | 0.2300 | Plastic | 1.544 | 56.1 |
|  | 11 | 4.499 | ASP | 0.1000 | | | |

TABLE 7B-continued

| Element | Surface (S#) | Radius R | Shape | Thickness or Separation | Material | Refractive Index $N_d$ | Abbe Number $V_d$ |
|---|---|---|---|---|---|---|---|
| L5 | 12 | 4.783 | ASP | 0.8288 | Plastic | 1.632 | 23.3 |
|  | 13 | −8.425 | ASP | 0.1000 |  |  |  |
| IR filter | 14 | INF | FLAT | 0.3000 | Glass | 1.516 | 64.1 |
|  | 15 | INF | FLAT | 0.6200 |  |  |  |
| Image plane | 16 | INF | FLAT |  |  |  |  |

TABLE 7C

ASPHERIC CONSTANTS

| S# | Curvature (c) | K | A<br>E | B<br>F | C<br>G | D<br>H |
|---|---|---|---|---|---|---|
| 4 | 0.63235800 | −0.18286867 | 6.89637E−03<br>−1.23504E−03 | −5.97278E−04<br>1.19145E−03 | 7.43545E−03<br>0.00000E+00 | −3.26628E−03<br>0.00000E+00 |
| 5 | −0.05050712 | 0.00000000 | 2.84470E−02<br>−5.22607E−03 | −3.15439E−03<br>2.83019E−04 | −1.53315E−02<br>0.00000E+00 | 1.66294E−02<br>0.00000E+00 |
| 6 | 0.06537890 | 0.00000000 | −2.98424E−02<br>−8.53628E−03 | 2.90046E−02<br>0.00000E+00 | 1.64261E−02<br>0.00000E+00 | −2.37258E−03<br>0.00000E+00 |
| 7 | 0.44352255 | −17.25746421 | 1.53032E−01<br>1.00578E−01 | −1.76850E−01<br>0.00000E+00 | 4.13733E−01<br>0.00000E+00 | −2.70598E−01<br>0.00000E+00 |
| 8 | −0.10924977 | 0.00000000 | 1.45017E−01<br>0.00000E+00 | 2.18633E−02<br>0.00000E+00 | 6.73353E−02<br>0.00000E+00 | −5.28971E−02<br>0.00000E+00 |
| 9 | −0.987658E−02 | 0.00000000 | 1.84770E−01<br>−3.80131E−02 | 3.47595E−02<br>0.00000E+00 | 3.19226E−02<br>0.00000E+00 | 8.61392E−03<br>0.00000E+00 |
| 10 | −0.33695059 | −2.41215664 | −5.27029E−02<br>−9.23157E−04 | −1.18014E−03<br>0.00000E+00 | −7.56505E−04<br>0.00000E+00 | 2.55693E−03<br>0.00000E+00 |
| 11 | 0.22228286 | 0.00000000 | −6.18610E−02<br>−1.93770E−04 | 4.79993E−03<br>0.00000E+00 | −2.38680E−03<br>0.00000E+00 | 9.03633E−04<br>0.00000E+00 |
| 12 | 0.20905993 | 0.00000000 | −3.36502E−02<br>0.00000E+00 | 7.78012E−03<br>0.00000E+00 | −1.72940E−04<br>0.00000E+00 | −5.43850E−05<br>0.00000E+00 |
| 13 | −0.11869224 | 0.00000000 | −3.60043E−02<br>0.00000E+00 | 8.75087E−03<br>0.00000E+00 | 8.19760E−04<br>0.00000E+00 | −1.98969E−04<br>0.00000E+00 |

TABLE 8A

| Focal length (f) | 7.0 mm |
| F-Number | 2.8 |
| Half FOV | 18° |
| Total track length (TTL) | 6.0 mm |
| Telephoto ratio (TTL/f) | 0.857 |
| Design wavelengths | 650 nm, 610 nm, 555 nm, 510 nm, 470 nm |

TABLE 8B

| Element | Surface (S#) | Radius R | Shape | Thickness or Separation | Material | Refractive Index $N_d$ | Abbe Number $V_d$ |
|---|---|---|---|---|---|---|---|
| Object plane | 0 | INF | FLAT | INF |  |  |  |
| L1 | 1 | 1.581 | ASP | 0.8579 | Plastic | 1.544 | 56.1 |
|  | 2 | −19.799 |  | 0.0500 |  |  |  |
| Aperture stop | 3 | INF | FLAT | 0.1810 |  |  |  |
| L2 | 4 | 15.295 | ASP | 0.2300 | Plastic | 1.632 | 23.3 |
|  | 5 | 2.255 | ASP | 0.5716 |  |  |  |
| L3 | 6 | −9.153 | ASP | 0.2300 | Plastic | 1.632 | 23.3 |
|  | 7 | −101.250 | ASP | 1.7007 |  |  |  |
| L4 | 8 | −2.968 | ASP | 0.2300 | Plastic | 1.544 | 56.1 |
|  | 9 | 4.499 | ASP | 0.1000 |  |  |  |
| L5 | 10 | 4.783 | ASP | 0.8288 | Plastic | 1.632 | 23.3 |
|  | 11 | −8.425 | ASP | 0.1000 |  |  |  |
| IR filter | 12 | INF | FLAT | 0.3000 | Glass | 1.516 | 64.1 |
|  | 13 | INF | FLAT | 0.6200 |  |  |  |
| Image plane | 14 | INF | FLAT |  |  |  |  |

TABLE 8C

ASPHERIC CONSTANTS

| S# | Curvature (c) | K | A<br>E | B<br>F | C<br>G | D<br>H |
|---|---|---|---|---|---|---|
| 1 | 0.63235800 | −0.18286867 | −0.18286867<br>−1.23504E−03 | 6.89637E−03<br>1.19145E−03 | 7.43545E−03<br>0.00000E+00 | −3.26628E−03<br>0.00000E+00 |
| 2 | −0.05050712 | 0.00000000 | 2.84470E−02<br>−5.22607E−03 | −3.15439E−03<br>2.83019E−04 | −1.53315E−02<br>0.00000E+00 | 1.66294E−02<br>0.00000E+00 |
| 4 | 0.06537890 | 0.00000000 | −2.98424E−02<br>−8.53628E−03 | 2.90046E−02<br>0.00000E+00 | 1.64261E−02<br>0.00000E+00 | −2.37258E−03<br>0.00000E+00 |
| 5 | 0.44352255 | −17.25746421 | 1.53032E−01<br>1.00578E−01 | −1.76850E−01<br>0.00000E+00 | 4.13733E−01<br>0.00000E+00 | −2.70598E−01<br>0.00000E+00 |
| 6 | −0.10924977 | 0.00000000 | 1.45017E−01<br>0.00000E+00 | 2.18633E−02<br>0.00000E+00 | 6.73353E−02<br>0.00000E+00 | −5.28971E−02<br>0.00000E+00 |
| 7 | −0.987658E−02 | 0.00000000 | 1.84770E−01<br>−3.80131E−02 | 3.47595E−02<br>0.00000E+00 | 3.19226E−02<br>0.00000E+00 | 8.61392E−03<br>0.00000E+00 |
| 8 | −0.33695059 | −2.41215664 | −5.27029E−02<br>−9.23157E−04 | −1.18014E−03<br>0.00000E+00 | −7.56505E−04<br>0.00000E+00 | 2.55693E−03<br>0.00000E+00 |
| 9 | 0.22228286 | 0.00000000 | −6.18610E−02<br>−1.93770E−04 | 4.79993E−03<br>0.00000E+00 | −2.38680E−03<br>0.00000E+00 | 9.03633E−04<br>0.00000E+00 |
| 10 | 0.20905993 | 0.00000000 | −3.36502E−02<br>0.00000E+00 | 7.78012E−03<br>0.00000E+00 | −1.72940E−04<br>0.00000E+00 | −5.43850E−05<br>0.00000E+00 |
| 11 | −0.11869224 | 0.00000000 | −3.60043E−02<br>0.00000E+00 | 8.75087E−03<br>0.00000E+00 | 8.19760E−04<br>0.00000E+00 | −1.98969E−04<br>0.00000E+00 |

Example Computing Device

Figure 17:
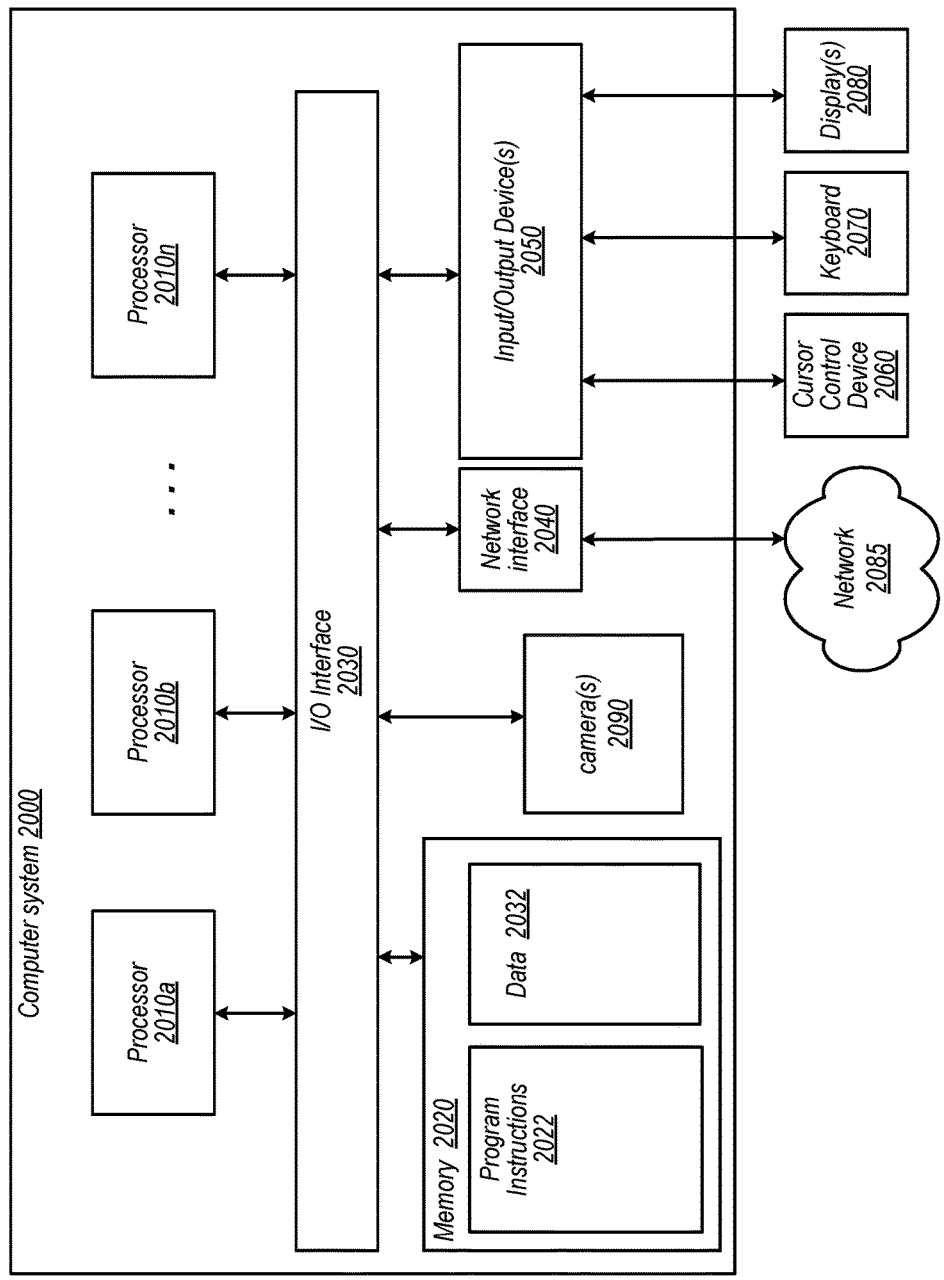
FIG. 17 illustrates an example computer system that may be used in embodiments.

FIG. 17 illustrates an example computing device, referred to as computer system 2000, that may include or host embodiments of the camera as illustrated in FIGS. 1 through 16. In addition, computer system 2000 may implement methods for controlling operations of the camera and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example one or more telephoto cameras as described above with respect to FIGS. 1 through 16, which may also be coupled to I/O interface 2030, or one or more telephoto cameras as described above with respect to FIGS. 1 through 16 along with one or more other cameras such as conventional wide-field cameras.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 17, memory 2020 may include program instructions 2022, which may be processor-executable to implement any element or action to support integrated camera 2090, including but not limited to image processing software and interface software for controlling camera 2090. In at least some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A telephoto lens system, comprising:
   a plurality of refractive lens elements arranged in order from an object side to an image side along an optical axis of the telephoto lens system, wherein at least one surface of at least one of the plurality of lens elements is aspheric, wherein the plurality of lens elements include at least a first lens element, a second lens element, a third lens element with negative refractive power and having a concave object side surface, and a fourth lens element with negative refractive power and having a concave image side surface;
   wherein the lens system has effective focal length f wherein total track length (TTL) of the lens system is 6.0 millimeters or less, and wherein telephoto ratio (TTL/f) of the lens system is within a range of 0.74 to 1.0; and
   wherein the lens system configured to refract light from an object field located in front of the first lens element to form an image at an image plane behind a last lens element of the plurality of lens elements.

2. The telephoto lens system as recited in claim 1, wherein the effective focal length f of the lens system is within a range of 6.0 millimeters to 8.0 millimeters, and wherein focal ratio of the lens system is within a range of 2.4 to 10.0.

3. The telephoto lens system as recited in claim 1, wherein the effective focal length f of the lens system is 7.0 millimeters, and wherein focal ratio of the lens system is 2.8.

4. The telephoto lens system as recited in claim 1, wherein the telephoto lens system further comprises an aperture stop located either at or in front of the first lens element of the lens system or between the first lens element and the second lens element of the lens system.

5. The telephoto lens system as recited in claim 4, wherein the aperture stop is adjustable to provide a focal ratio within a range of 2.4 to 10.

6. The telephoto lens system as recited in claim 1, wherein at least two of the plurality of lens elements are composed of a first plastic material, and wherein at least two others of the plurality of lens elements are composed of a second plastic material with different optical characteristics than the first plastic material.

7. The telephoto lens system as recited in claim 1, wherein the plurality of lens elements includes, in order along the optical axis from the object side to the image side:
the first lens element with positive refractive power having a convex object side surface;
the second lens element with negative refractive power; and
a fifth lens element with positive refractive power having a convex image side surface.

8. The telephoto lens system as recited in claim 7, wherein the first lens element is a biconvex lens, and wherein focal length f1 of the first lens element satisfies the condition $0.35 < f1/f < 0.45$.

9. The telephoto lens system as recited in claim 7, wherein the second lens element has either a convex object side surface or a concave object side surface, and wherein one or both of the third lens element and the fourth lens element are biconcave lenses.

10. The telephoto lens system as recited in claim 1, wherein the first lens element and the second lens element form a Gaussian doublet of positive refractive power and focal length f12 that satisfies the relation $0.75 < f12/f < 1.0$, and wherein the third lens element and the fourth lens element form an air-spaced doublet of negative refractive power and focal length f34 that satisfies the relation $-2.0 < f34/f < -1.0$.

11. A telephoto lens system, comprising:
a plurality of refractive lens elements arranged in order from an object side to an image side along an optical axis of the telephoto lens system, wherein at least one surface of at least one of the plurality of lens elements is aspheric, wherein the plurality of lens elements include at least a first lens element, a second lens element, a third lens element with negative refractive power and having a concave object side surface, and a fourth lens element with negative refractive power and having, a concave image side surface;
wherein the telephoto lens system has effective focal length f within a range of 6.0 millimeters to 8.0 millimeters, wherein total track length (TTL) of the telephoto lens system is 7.0 millimeters or less, and wherein telephoto ratio (TTL/f) of the lens system is within a range of 0.74 to 1.0; and
wherein the lens system configured to refract light from an object field located in front of a first lens element of the plurality of lens elements to form an image at an image plane behind a last lens element of the plurality of lens elements.

12. The telephoto lens system as recited in claim 11, wherein focal ratio of the lens system is within a range of 2.4 to 10.0.

13. The telephoto lens system as recited in claim 11, wherein the telephoto lens system further comprises an aperture stop located either at or in front of the first lens element of the lens system or between the first lens element and the second lens element of the lens system.

14. The telephoto lens system as recited in claim 13, wherein the aperture stop is adjustable to provide a focal ratio within a range of 2.4 to 10.

15. The telephoto lens system as recited in claim 11, wherein at least two of the plurality of lens elements are composed of a first plastic material, and wherein at least two others of the plurality of lens elements are composed of a second plastic material with different optical characteristics than the first plastic material.

16. The telephoto lens system as recited in claim 11, wherein the plurality of lens elements includes, in order along the optical axis from the object side to the image side:
the first lens element with positive refractive power having a convex object side surface;
the second lens element with negative refractive power having a convex object side surface; and
a fifth lens element with positive refractive power having a convex image side surface.

17. The telephoto lens system as recited in claim 16, wherein the fifth lens element has positive focal length f5, vertex radii of curvature R10 and R11, and satisfies the conditions $(0.75 < f5/f < 1.2)$ and $(-1 < R10/R11 < 0)$.

18. The telephoto lens system as recited in claim 11, wherein the first lens element and the second lens element form a Gaussian doublet of positive refractive power and focal length f12 that satisfies the relation $0.75 < f12/f < 1.0$, and wherein the third lens element and the fourth lens element form an air-spaced doublet of negative refractive power and focal length f34 that satisfies the relation $-2.0 < f34/f < -1.0$.

19. A camera module, comprising:
a photosensor configured to capture light projected onto a surface of the photosensor; and
a telephoto lens system configured to refract light from an object field located in front of the camera to form an image of a scene at an image plane at or near the surface of the photosensor, wherein the lens system comprises a plurality of refractive lens elements arranged in order from an object side to an image side along an optical axis of the camera, wherein at least one surface of at least one of the plurality of lens elements is aspheric, wherein the plurality of lens elements include at least a first lens element, a second lens element, a third lens element with negative refractive power and having a concave object side surface, and a fourth lens element with negative refractive power and having a concave image side surface;
wherein the telephoto lens system has effective focal length f within a range of 6.0 millimeters to 8.0 millimeters, wherein total track length (TTL) of the telephoto lens system is 7.0 millimeters or less, and wherein telephoto ratio (TTL/f ) of the lens system is within a range of 0.74 to 1.0.

20. The camera module as recited in claim 19, wherein the telephoto lens system further comprises an aperture stop located either at or in front of the first lens element of the lens system or between the first lens element and the second lens element of the lens system.

* * * * *